United States Patent
Hino et al.

(10) Patent No.: US 8,777,791 B1
(45) Date of Patent: Jul. 15, 2014

(54) BICYCLE DRIVE UNIT

(71) Applicant: Shimano Inc., Osaka (JP)

(72) Inventors: Tetsuya Hino, Osaka (JP); Akihiko Shoge, Osaka (JP); Minoru Ito, Osaka (JP)

(73) Assignee: Shimano Inc., Osaka (JP)

(*) Notice: Subject to any disclaimer, the term of this patent is extended or adjusted under 35 U.S.C. 154(b) by 16 days.

(21) Appl. No.: 13/761,516

(22) Filed: Feb. 7, 2013

(51) Int. Cl.
*F16H 3/72* (2006.01)
*B62M 6/55* (2010.01)

(52) U.S. Cl.
USPC .................................. 475/5; 180/206.4

(58) Field of Classification Search
USPC ............................................. 475/5
See application file for complete search history.

(56) References Cited

U.S. PATENT DOCUMENTS

| | | | |
|---|---|---|---|
| 6,012,538 A * | 1/2000 | Sonobe et al. | 180/220 |
| 6,073,717 A * | 6/2000 | Yamamoto et al. | 180/206.4 |
| 6,196,347 B1 * | 3/2001 | Chao et al. | 180/206.2 |
| 6,296,072 B1 * | 10/2001 | Turner | 180/220 |
| 6,516,908 B2 * | 2/2003 | Tseng | 180/206.2 |
| 6,607,465 B1 | 8/2003 | Shoge | |
| 7,059,989 B2 * | 6/2006 | Fukui | 475/149 |
| 8,205,705 B2 * | 6/2012 | Li et al. | 180/206.4 |
| 8,590,655 B2 * | 11/2013 | Chan | 180/206.4 |
| 8,640,805 B2 * | 2/2014 | Kuroki | 180/206.1 |
| 8,646,560 B2 * | 2/2014 | Chan | 180/206.3 |
| 8,651,993 B1 * | 2/2014 | Watarai | 475/205 |
| 2013/0095971 A1 * | 4/2013 | Hino et al. | 475/5 |

FOREIGN PATENT DOCUMENTS

| | | |
|---|---|---|
| EP | 2380806 A2 | 10/2011 |
| JP | 8-310478 A | 11/1996 |
| JP | 4959858 B2 | 3/2012 |

* cited by examiner

*Primary Examiner* — Dirk Wright
(74) *Attorney, Agent, or Firm* — Global IP Counselors

(57) ABSTRACT

A bicycle drive unit includes a motor, a crank axle, a torque combining mechanism, and a clutch mechanism. The crank axle is rotatable about a first rotational axis. The torque combining mechanism is operatively coupled to the motor and the crank axle. The torque combining mechanism has a sprocket mounting portion that is configured to be operatively attached to a sprocket such that the sprocket rotates about a second rotational axis of the sprocket in a first direction as the crank axle rotates about the first rotational axis in the first direction. The clutch mechanism is operatively disposed between the crank axle and the sprocket. The clutch mechanism is configured to rotate the sprocket about the second rotational axis in a second direction as the crank axle rotates about the first rotational axis in the second direction. The second direction is opposite the first direction.

23 Claims, 18 Drawing Sheets

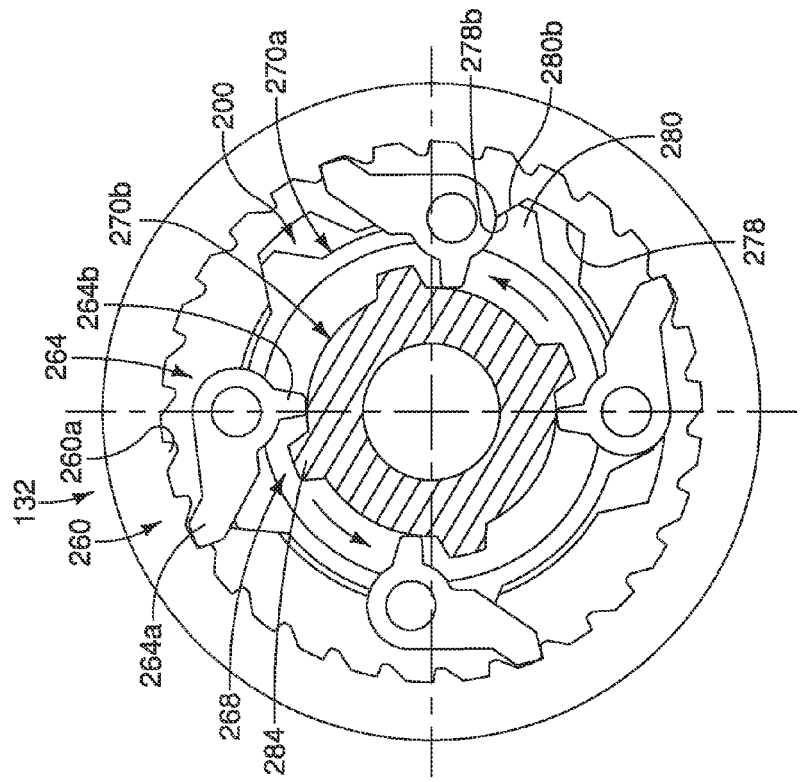
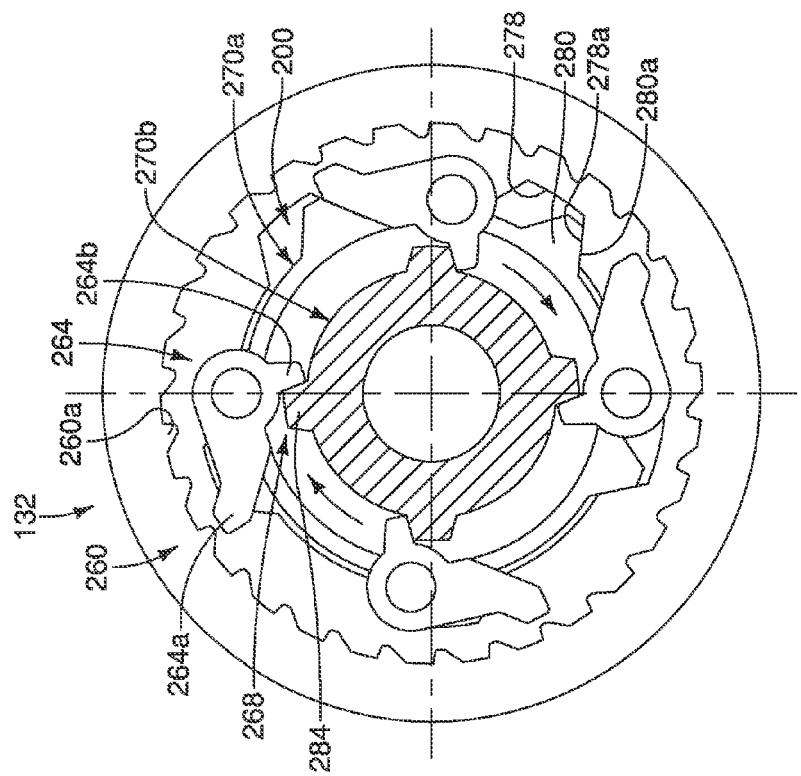

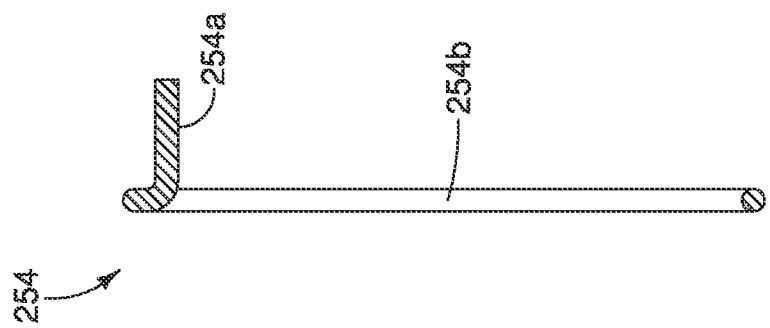
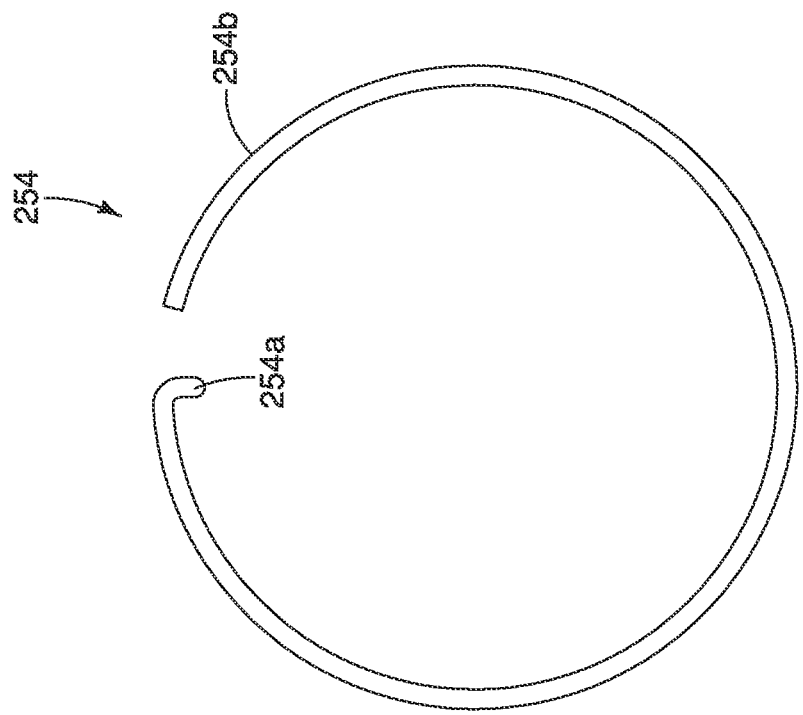

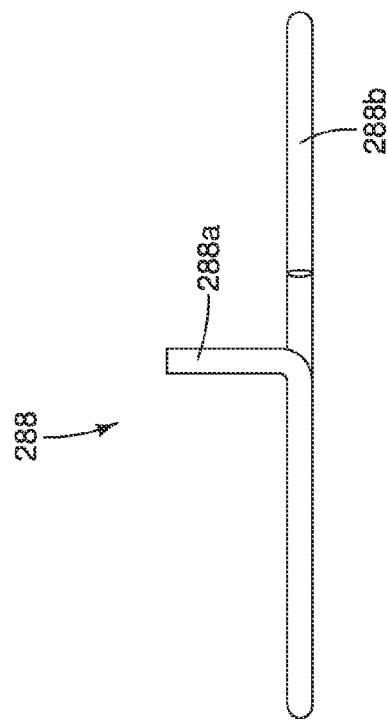
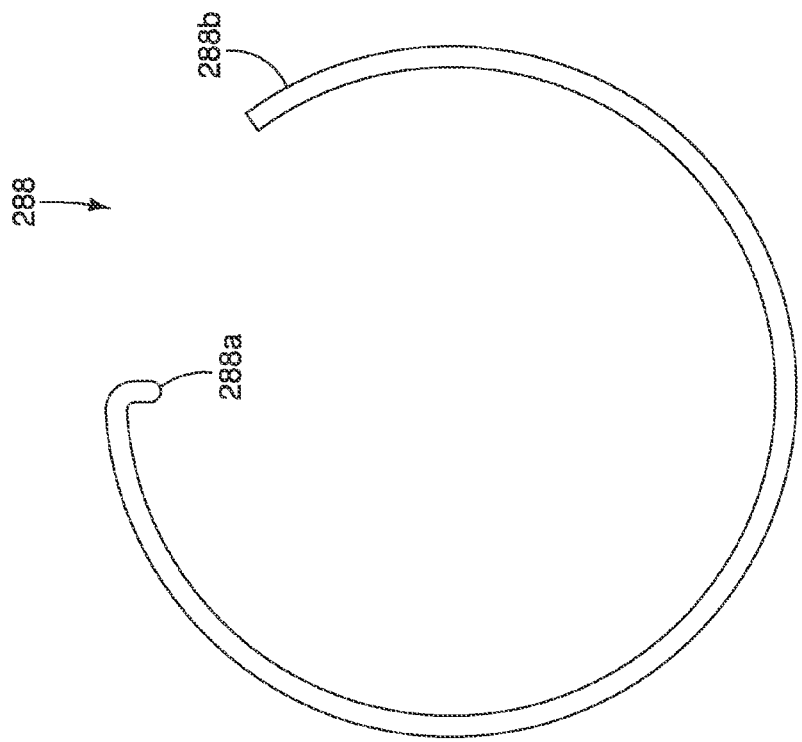

BICYCLE DRIVE UNIT

BACKGROUND

1. Field of the Invention

The present invention generally relates to a bicycle drive unit. In particular, the present invention relates to a drive unit for an electrically assisted bicycle.

2. Background Information

A coaster brake is conventionally known that is disposed on a bicycle (see European Patent Application Publication No. 2 380 806 A2 (Patent Citation 1) and Japanese Patent No. 4959858 (Patent Citation 2), for example). Generally, a bicycle crank arm and a front gear are non-rotatably coupled to each other. The coaster brake is disposed on a bicycle rear hub, and is operatively coupled to the front gear. Thus, when the bicycle crank arm is rotated in a rearward rotational direction, the coaster brake is operated.

On the other hand, an electrically assisted bicycle is conventionally known that uses a motor output as assisting power (see Japanese Laid-Open Patent Application Publication No. H08-310478 (Patent Citation 3), for example). In the electrically assisted bicycle, after a pedaling force which is inputted by the pedals is transmitted and the transmitted drive force is combined with a drive force from the motor, the combined drive force is transmitted to the rear wheel, thereby causing the rear wheel to rotate.

SUMMARY

It has been discovered that a coaster brake can not be merely applied to the electrically assisted bicycle. In particular, the Patent Citation 3 discloses a one-way clutch disposed between a crank arm and a front gear. The one-way clutch prevents a rotation of the crank arm in response to a rotation of an electric motor. However, it has been discovered that when the crank arm is rotated in a rearward rotational direction, the front gear does not rotate. Thus, even if the coaster brake is applied to the electrically assisted bicycle, the coaster brake can not be operated.

One aspect is to provide a bicycle drive unit that can be utilized with a bicycle coaster brake.

In accordance with a first aspect, a bicycle drive unit includes a motor, a crank axle, a torque combining mechanism, and a clutch mechanism. The crank axle is rotatable about a first rotational axis. The torque combining mechanism is operatively coupled to the motor and the crank axle to combine rotational outputs of the motor and the crank axle. The torque combining mechanism has a sprocket mounting portion that is configured to be operatively attached to a sprocket such that the sprocket rotates about a second rotational axis of the sprocket in a first direction as the crank axle rotates about the first rotational axis in the first direction. The clutch mechanism is operatively disposed between the crank axle and the sprocket. The clutch mechanism is configured to rotate the sprocket about the second rotational axis in a second direction as the crank axle rotates about the first rotational axis in the second direction. The second direction is opposite the first direction.

In accordance with a second aspect, with the bicycle drive unit according to the first aspect, the first and second rotational axes are coincident with each other.

In accordance with a third aspect, with the bicycle drive unit according to the first aspect, the clutch mechanism permits a relative rotation between the crank axle and the sprocket in the first direction.

In accordance with a fourth aspect, the bicycle drive unit according to the first aspect further includes a gear shifting mechanism. The gear shifting mechanism includes a support axle, an input part, an output part, a planetary gear unit. The input part is rotatably supported on the support axle and operatively coupled to the crank axle. The output part is rotatably supported on the support axle and operatively coupled to the torque combining mechanism. The planetary gear unit is disposed between the input part and the output part.

In accordance with a fifth aspect, with the bicycle drive unit according to the fourth aspect, the clutch mechanism is supported to the support axle of the gear shifting mechanism such that the clutch mechanism is operatively disposed between a planetary gear carrier of the planetary gear unit and the output part of the gear shifting mechanism.

In accordance with a sixth aspect, with the bicycle drive unit according to the fifth aspect, the clutch mechanism includes a toothed part, a pawl support, an engagement pawl, and a biasing member. The toothed part is disposed on one of the output part of the gear shifting mechanism and the planetary gear carrier of the planetary gear unit. The pawl support is movably attached to the other of the output part of the gear shifting mechanism and the planetary gear carrier of the planetary gear unit. The engagement pawl is movably mounted to the pawl support between a release position and an engagement position. The biasing member biases the engagement pawl towards the engagement position.

In accordance with a seventh aspect, with the bicycle drive unit according to the fifth aspect, the clutch mechanism includes an internally toothed part, a pawl support, an engagement pawl, a biasing member, and a control part. The internally toothed part is disposed on an inner peripheral surface of the output part of the gear shifting mechanism. The pawl support is movably attached to the planetary gear carrier of the planetary gear unit. The engagement pawl is movably mounted to the pawl support between a release position and an engagement position. The biasing member biases the engagement pawl towards the engagement position. The control part is disposed on an outer peripheral surface of the planetary gear carrier of the planetary gear unit. The control part selectively causes the engagement pawl to engage with the toothed part as the crank axle rotates in the second direction such that the clutch mechanism transmits a rotation of the crank axle to the output part of the gear shifting mechanism.

In accordance with an eighth aspect, with the bicycle drive unit according to the sixth aspect, the pawl support has one of a recess and a projection disposed in a circumferential direction of the pawl support. The planetary gear carrier of the planetary gear unit has the other of recess and a projection located in the recess. The recess and the projection are arranged relative to each other with circumferential spacing therebetween to provide a limited range of relative rotation between the pawl support and the planetary gear carrier.

In accordance with a ninth aspect, with the bicycle drive unit according to the eighth aspect, the projection has a contact surface that circumferentially contacts with an inside surface of the recess as the crank axle rotates in the first direction such that the rotation of the crank axle in the first direction is transmitted from the planetary gear carrier of the planetary gear unit to the output part of the gear shifting mechanism.

In accordance with a tenth aspect, with the bicycle drive unit according to the sixth aspect, the clutch mechanism further includes a retaining member operatively disposed between the support axle and the pawl support. The retaining member maintains relative angular position between the pawl support and the support axle before the engagement pawl engages with the output part.

In accordance with an eleventh aspect, with the bicycle drive unit according to the tenth aspect, the retaining member of the clutch mechanism further includes a slide spring having a leg portion and a ring portion. The leg portion is non-rotatably coupled to the support axle of the gear shifting mechanism. The ring portion extends from the leg portion and is disposed in an outer circumferential groove of the pawl support of the clutch mechanism.

In accordance with a twelfth aspect, with the bicycle drive unit according to the fourth aspect, the planetary gear unit includes first and second sun gears that are operatively connected by a slide spring.

In accordance with a thirteenth aspect, with the bicycle drive unit according to the twelfth aspect, the slide spring has a leg portion and a ring portion. The leg portion is disposed in a receiving hole of the first sun gear. The ring portion extends from the leg portion and is disposed in an inner circumferential groove of the second sun gear.

In accordance with a fourteenth aspect, with the bicycle drive unit according to the first aspect, the clutch mechanism is supported on one of the crank axle, the sprocket and the torque combining mechanism between the crank axle and the sprocket.

In accordance with a fifteenth aspect, the bicycle drive unit according to the fourteenth aspect further includes a gear shifting mechanism. The gear shifting mechanism includes a support axle, an input part, an output part, and a planetary gear unit. The input part is rotatably supported on the support axle and is operatively coupled to the crank axle. The output part is rotatably supported on the support axle and is operatively coupled to the torque combining mechanism. The planetary gear unit is disposed between the input part and the output part.

In accordance with a sixteenth aspect, with the bicycle drive unit according to the fourteenth aspect, the clutch mechanism includes a toothed part, a pawl support, an engagement pawl, and a biasing member. The toothed part is disposed on one of the sprocket mounting portion and the crank axle. The pawl support is fixedly coupled to the other of the sprocket mounting portion and the crank axle. The engagement pawl is movably mounted to the pawl support between a release position and an engagement position. The biasing member biases the engagement pawl towards the engagement position.

In accordance with a seventeenth aspect, with the bicycle drive unit according to the fourteenth aspect, the clutch mechanism includes a toothed part, a pawl support, an engagement pawl, and a biasing member. The toothed part is disposed on one of the sprocket and the crank axle. The pawl support is fixedly coupled to the other of the sprocket and the crank axle. The engagement pawl is movably mounted to the pawl support between a release position and an engagement position. The biasing member biases the engagement pawl towards the engagement position.

In accordance with an eighteenth aspect, with the bicycle drive unit according to the fourteenth aspect, the clutch mechanism includes an internally toothed part, a pawl support, an engagement pawl, a biasing member, and a control part. The internally toothed part is disposed on an inner peripheral surface of the sprocket. The pawl support is fixedly coupled to the crank axle. The engagement pawl is movably mounted to the pawl support between a release position and an engagement position. The biasing member biases the engagement pawl towards the engagement position. The control part is disposed on an inner peripheral surface of an output member of the torque combining mechanism. The control part selectively causes the engagement pawl to engage with the toothed part as the crank axle rotates in the second direction such that the clutch mechanism transmits a rotation of the crank axle to the sprocket.

In accordance with a nineteenth aspect, with the bicycle drive unit according to the eighteenth aspect, the control part is aligned with the toothed part as the crank axle rotates in the first direction such that the engagement pawl slides over the control part and the toothed part as the crank axle rotates in the first direction.

In accordance with a twentieth aspect, with the bicycle drive unit according to the fourteenth aspect, the sprocket mounting portion of the torque combining mechanism has one of a recess and a projection. The sprocket has the other of the recess and the projection. The recess and the projection are arranged relative to each other with circumferential spacing therebetween to provide a limited range of relative rotation between the sprocket mounting portion of the torque combining mechanism and the sprocket.

In accordance with a twenty-first aspect, with the bicycle drive unit according to the twentieth aspect, the recess has an inside surface that circumferentially contacts with a contact surface of the projection as the crank axle rotates in the first direction such that a rotation of the crank axle in the first direction is transmitted from the sprocket mounting portion of the torque combining mechanism to the sprocket.

In accordance with a twenty-second aspect, with the bicycle drive unit according to the first aspect, the motor includes a crank axle receiving hole. The crank axle is rotatably disposed in the crank axle receiving hole of the motor.

In accordance with a twenty-third aspect, with the bicycle drive unit according to the first aspect, the torque combining mechanism is operatively connected to a rotational output portion of the motor through a one-way clutch to receive the rotational output of the motor.

BRIEF DESCRIPTION OF THE DRAWINGS

Referring now to the attached drawings which form a part of this original disclosure:

FIG. 6 is a cross-sectional view illustrating the clutch mechanism of the drive unit illustrated in FIG. 2, taken along VI-VI line in FIG. 3, with an engagement pawl disengaged from an internally toothed part;

FIG. 7 is a cross-sectional view illustrating the clutch mechanism of the drive unit illustrated in FIG. 2, taken along VII-VII line in FIG. 3, with the engagement pawl engaged with the internally toothed part;

FIG. 8 is an elevational view of a slide spring disposed between first and second sun gears of the gear shifting mechanism illustrated in FIG. 5, illustrating an unloaded state of the slide spring;

FIG. 9 is a cross-sectional view of the slide spring illustrated in FIG. 8;

FIG. 10 is an elevational view of a slide spring of the clutch mechanism illustrated in FIG. 4, illustrating a loaded state of the slide spring;

FIG. 11 is a top plan view of the slide spring illustrated in FIG. 10, illustrating an unloaded state of the slide spring;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
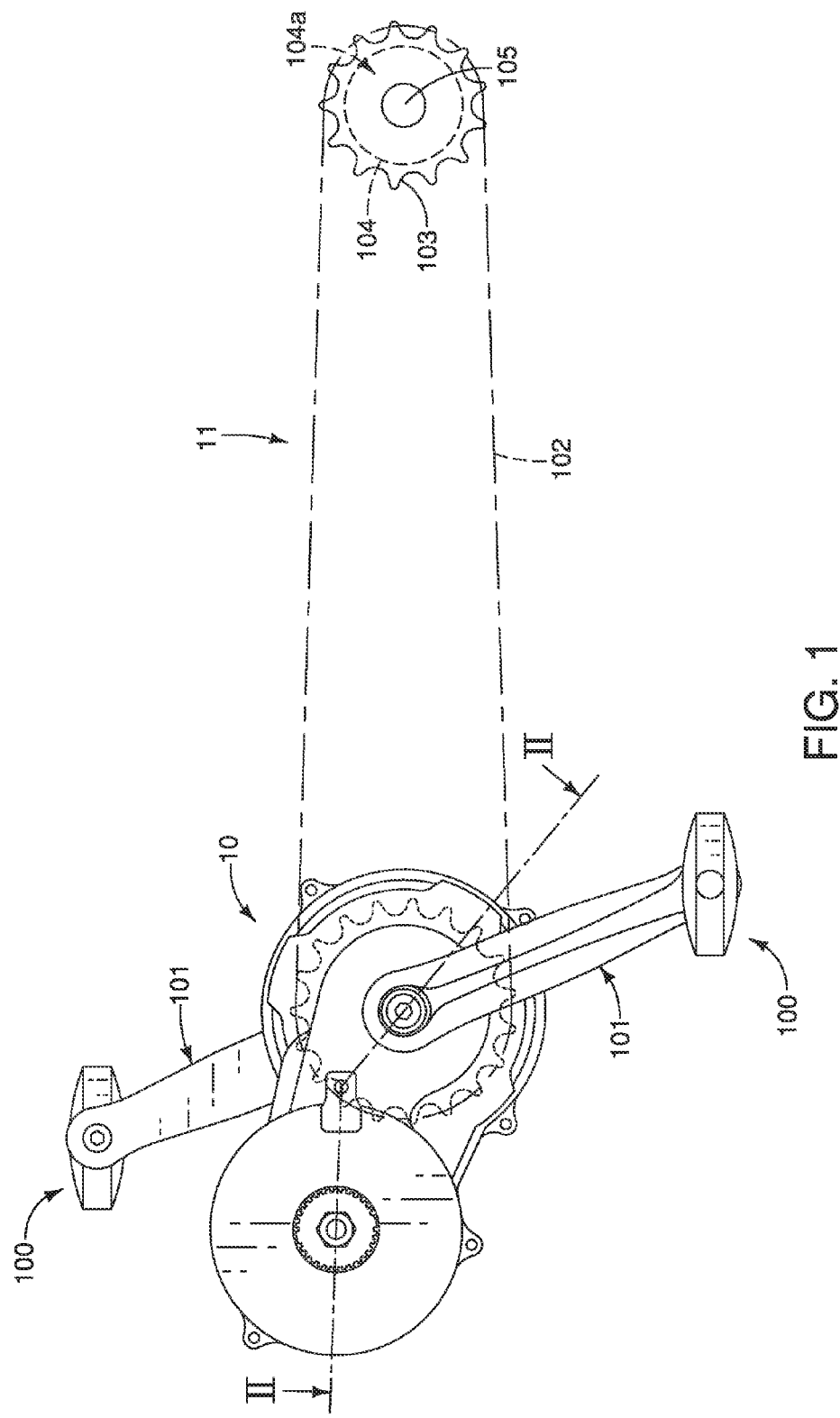
FIG. 1 is a side elevational view of a drive train of an electrically assisted bicycle that is equipped with a drive unit in accordance with a first embodiment.
Figure 2:
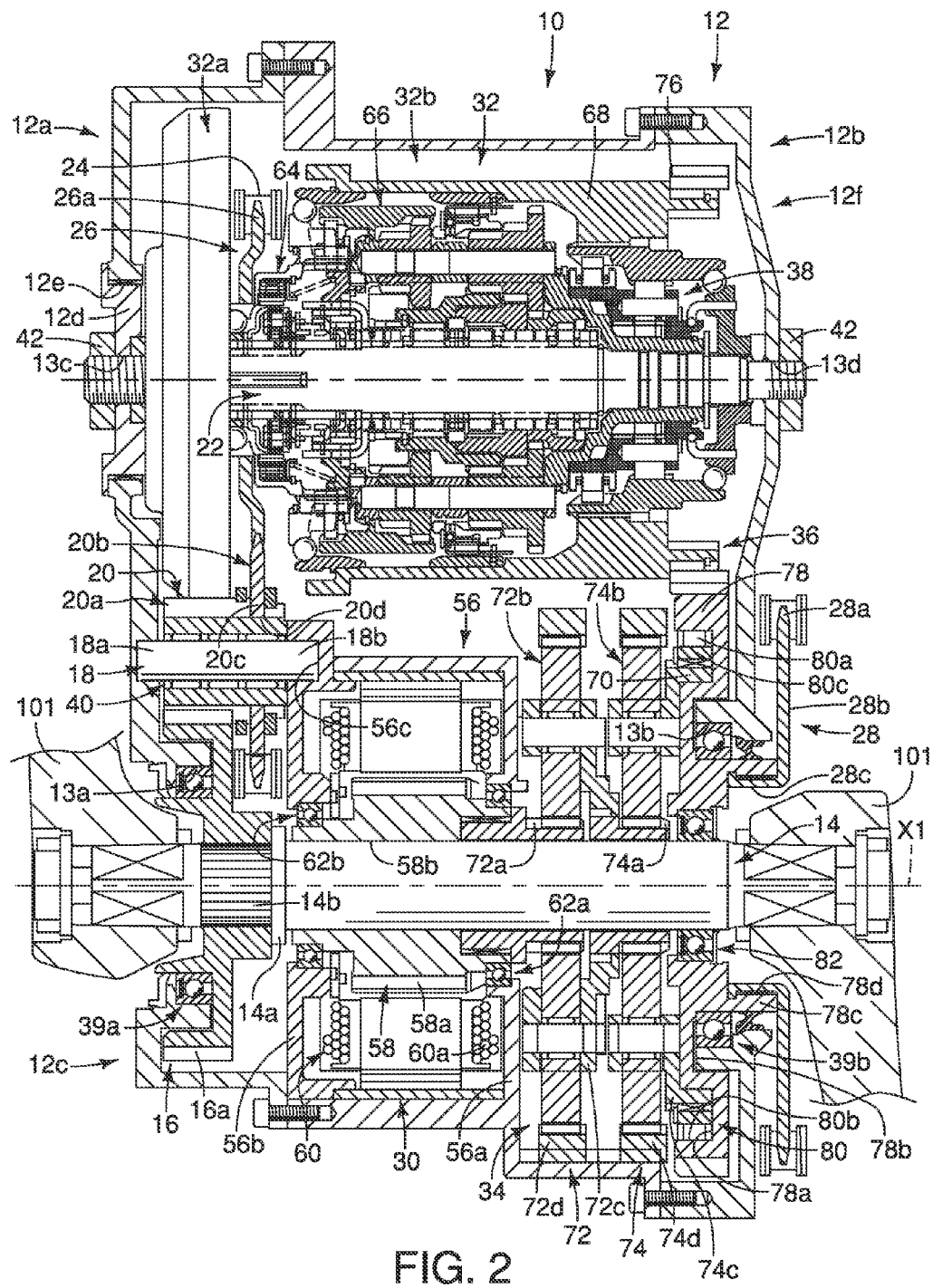
FIG. 2 is a cross-sectional view illustrating the drive unit in accordance with the first embodiment, taken along II-II line in FIG. 1.

Referring initially to FIGS. 1 and 2, a drive unit 10 is illustrated in accordance with a first embodiment. As illustrated in FIG. 1, the drive unit 10 is disposed on a drive train 11 of an electrically assisted bicycle. In the illustrated embodiment, FIG. 1 only illustrates portions related to the drive train 11 of the electrically assisted bicycle since other portions of the electrically assisted bicycle can be conventional. Thus, detailed description of the electrically assisted bicycle will be omitted for the sake of brevity. As illustrated in FIG. 1, the drive train 11 basically includes a pair of pedals 100, a pair of crank arms 101, the drive unit 10, a first chain 102, a rear sprocket 103 and a rear hub 104. The pedals 100 are rotatably mounted to the free ends of the crank arms 101, respectively. The inner ends of the crank arms 101 are fixed to opposite ends of a crank axle 14 (see FIG. 2) of the drive unit 10, respectively. The first chain is operatively connected between the drive unit 10 and the rear sprocket 103. For the drive train 11 of the electrically assisted bicycle, pedaling force acting on the pedals 100 is transmitted to the rear hub 104 that is rotatably coupled to a rear hub axle 105 to rotate a rear wheel (not shown) of the electrically assisted bicycle via the following transmission passage: the crank arms 101→the drive unit 10→the first chain 102→the rear sprocket 103→the rear hub 104. While transmitting the pedaling force, the drive unit 10 synthesizes a motor output torque as an assisting power for assisting the pedaling force. In the illustrated embodiment, when a pedaling force more than a prescribed threshold is detected, then the motor output torque corresponding to the pedaling force is generated as the assisting power. The drive unit 10 is usually arranged in a vicinity of a connecting section between a seat tube (not shown) of a bicycle frame and a down tube (not shown) of the bicycle frame. A battery for the drive unit 10 is arranged along a rear carrier, the down tube or the seat tube.

In the illustrated embodiment, the rear hub 104 is equipped with a coaster brake 104a. The coaster brake 104a is operated for generating a braking force to the rear wheel via the rear hub 104 in response to a rearward rotation of the crank arms 101. In particular, in the illustrated embodiment, the coaster brake 104a of the rear hub 104 is operated in response to the rearward rotation of the crank arms 101 via the drive unit 10, the first chain 102 and the rear sprocket 103. Since coaster brakes are conventionally well known, the detailed description will be omitted for the sake of brevity.

As illustrated in FIG. 1, the drive unit 10 is arranged in a vicinity of the crank arms 101. In the illustrated embodiment, as shown in FIG. 2, the drive unit 10 has a housing 12, a crank axle 14, a first rotation transmitting member 16, an intermediate axle 18, a second rotation transmitting member 20, a support axle 22, a second chain 24, a third rotation transmitting member 26 and a front sprocket 28 (e.g., a sprocket). In the illustrated embodiment, the crank axle 14, the intermediate axle 18 and the support axle 22 are arranged to extend parallel to each other at spaced locations. As shown in FIG. 2, the drive unit 10 has a motor 30, a gear shifting mechanism 32, a reduction gear unit 34, a torque combining mechanism 36, and a clutch mechanism 38. Thus, the bicycle drive unit 10 includes the motor 30, the crank axle 14, the torque combining mechanism 36, and the clutch mechanism 38.

As shown in FIG. 2, the housing 12 accommodates the first rotation transmitting member 16, the second rotation transmitting member 20, the third rotation transmitting member 26, the motor 30, the gear shifting mechanism 32, the reduction gear unit 34, the torque combining mechanism 36, and the clutch mechanism 38.

The housing 12 is a member made of, for example, aluminum or another metal. However, a part or the entire of the housing 12 can also be made of a synthetic resin. The housing 12 has a first side wall 12a and a second side wall 12b. The first side wall 12a and the second side wall 12b are independently formed as separate parts, and face with each other in an axial direction of the crank axle 14. The housing 12 has a housing main body containing the second side wall 12b and a lid member containing the first side wall 12a. The lid member is anchored detachably on the opening of the housing main body by bolts or other anchoring members to form an accommodating space for accommodating the first rotation transmitting member 16, the second rotation transmitting member 20, the third rotation transmitting member 26, the motor 30, the gear shifting mechanism 32, the reduction gear unit 34, the torque combining mechanism 36, and the clutch mechanism 38. The first side wall 12a has a first side wall main body 12c and a first plate member 12d. The first plate member 12d is installed detachably and non-rotatably on the first engagement hole 12e formed on the first side wall main body 12c. The second side wall 12b has a second side wall main body 12f.

The first plate member 12d is made of a metal material different from the first side wall main body 12c. Of course, alternatively, they can be made of the same material as the first side wall main body 12c. The first plate member 12d is installed detachably from the outer side of the housing 12 on the first side wall main body 12c. The first plate member 12d is formed here as a round plate, with serrations and flanges for engagement with the first engagement hole 12e formed on their outer peripheral portions. The serrations of the first plate member 12d are engaged with the first engagement hole 12e. The flange of the first plate member 12d contacts with the side surface of the first side wall main body 12c. On the first engagement hole 12e, serration grooves for engaging with the serrations of the first plate member 12d are formed. With this configuration, the first plate member 12d is non-rotatably coupled to the first side wall main body 12c.

The housing 12 has a pair of round shaped first holes 13a and 13b, a pair of second holes 13c and 13d. The first holes 13a and 13b are formed on the first side wall main body 12c and the second side wall main body 12f, respectively. In the illustrated embodiment, first and second bearings 39a and 39b, such as a ball bearing, are arranged in the first holes 13a and 13b, respectively.

The second holes 13c and 13d are formed on the first plate member 12d and the second wall main body 12f. In the second holes 13c and 13d, the support axle 22 is non-rotatably arranged in the second holes 13c and 13d. In the illustrated embodiment, the first plate member 12d is detachably coupled to the first side wall main body 12c. Of course, alternatively, the first plate member 12d can be pressed in and integrated with the first side wall main body 12c.

The crank axle 14 is a metal axle member made of, for example, iron, stainless steel, or the like. The crank axle 14 is rotatable about a rotational axis X1 (e.g., a first rotational axis). The crank axle 14 is rotatably supported by the first bearing 39a and the second bearing 39b. The two ends of the crank axle 14 are arranged to protrude out from the first side wall 12a and the second side wall 12b, respectively. On the end portions of the crank axle 14, the crank arms 101 are detachably and non-rotatably coupled to the crank axle 14. In the end portion of the crank axle 14 on the first side wall main body 12c side, the crank axle 14 has a large-diameter flange section 14a for positioning the first rotation transmitting member 16 in the axial direction and a serration section 14b for connecting with the first rotation transmitting member 16. The large-diameter flange section 14a and the serration section 14b are arranged adjacent to each other. The flange section 14a is formed on the entire circumference in the circumferential direction of the crank axle 14. Of course, alternatively, the flange section 14a can be formed intermittently in the circumferential direction and protruding out from the crank axle 14.

The first rotation transmitting member 16 is non-rotatably coupled to the crank axle 14 such that the first rotation transmitting member 16 transmits the rotation of the crank arms 101. The first rotation transmitting member 16 has a first gear 16a made of, for example, a synthetic resin or a metal. The first gear 16a is connected to the serration section 14b of the crank axle 14 such that the first gear 16a and the crank axle 14 rotate together. The first gear 16a is fastened to the crank axle 14 by press-fit, bonding or another appropriate fastening manner. The first gear 16a makes contact with the flange section 14a of the crank axle 14 such that the first gear 16a is positioned in the axial direction of the crank axle 14. The first gear 16a is rotatably supported to the housing 12 via the first bearing 39a. The crank axle 14 is rotatably supported to the housing 12 via the first bearing 39a and the first gear 16a.

The intermediate axle 18 is an axle member made of iron, stainless steel or another metal. The intermediate axle 18 has first and second end portions 18a and 18b. The first end portion 18a is supported on the first side wall main body 12c, while the second end portion 18b is supported on a second case 56b of a motor case 56 of the motor 30. The intermediate axle 18 rotatably supports the second rotation transmitting member 20.

The second rotation transmitting member 20 is a member that transmits the rotation of the first rotation transmitting member 16. The second rotation transmitting member 20 has a second gear 20a that meshes with the first gear 16a, and a first sprocket 20b that rotates together with the second gear 20a. The second rotation transmitting member 20 is a member made of, for example, a synthetic resin or a metal. The second rotation transmitting member 20 is rotatably supported on the intermediate axle 18 via a bearing 40, such as, for example, a needle-shaped roller bearing. The second gear 20a has an engagement section 20c engaged with an inner peripheral portion 20d of the first sprocket 20b. The engagement section 20c is formed on a toothed surface that is not engaged with the first gear 16a among the toothed surface of the second gear 20a. On the inner peripheral portion 20d of the first sprocket 20b, an engagement portion engaged with at least a portion of the second gear 20a is formed. As a result, the second gear 20a and the first sprocket 20b are non-rotatably coupled to each other. Furthermore, retainers are disposed on the second gear 20a for prohibiting an axial movement of the first sprocket 20b in the axial direction of the intermediate axle 18. The retainers are disposed on both sides of the first sprocket 20b in the axial direction of the intermediate axle 18.

The support axle 22 is arranged to support the gear shifting mechanism 32 and the clutch mechanism 38 with respect to the housing 12. The support axle 22 has end portions that extend through the second holes 13c and 13d. The end portions of the support axle 22 are fastened to the first and second side walls 12a and 12b with the nuts 42, respectively. As a result, they are fastened to the first and second side walls 12a and 12b, respectively. The support axle 22 extends through the gear shifting mechanism 32 and the clutch mechanism 38. The support axle 22 rotatably supports the third rotation transmitting member 26.

The third rotation transmitting member 26 is a member that transmits the rotation of the second rotation transmitting member 20. The rotation of the second rotation transmitting member 20 is transmitted by the second chain 24 to the third rotation transmitting member 26. The third rotation transmitting member 26 has a second sprocket 26a engaged with the second chain 24. The second chain 24 is wound on the first sprocket 20b and the second sprocket 26a. The second sprocket 26a is operatively coupled to the gear shifting mechanism 32. In particular, the second sprocket 26a is fixedly coupled to an input part 64 of the gear shifting mechanism 32. Thus, the second sprocket 26a is rotatably supported on the support axle 22 via the input part 64.

As shown in FIG. 2, the motor 30 is an inner rotor-type motor. The motor 30 has the motor case 56, a rotor 58 that is rotatably supported on the motor case 56, and a stator 60 installed on the motor case 56. In the illustrated embodiment, the motor case 56 has a first case 56a integrally formed with the housing 12, and the second case 56b detachably coupled to the first case 56a. The motor case 56 further has an axle supporting recess 56c that supports the second end portion 18b of the intermediate axle 18 on the second case 56b.

The rotor 58 is a cylindrical member that is coaxially arranged relative to the crank axle 14. The crank axle 14 extends through the rotor 58. The rotor 58 has a magnet unit 58a with a plurality of magnetic poles arranged on the outer peripheral portion of the rotor 58 side by side in the circumferential direction. The rotor 58 of the motor 30 has a crank axle receiving hole 58b. The crank axle 14 is rotatably disposed in the crank axle receiving hole 58b of the rotor 58 of the motor 30. The rotor 58 is rotatably supported on the motor case 56 by a pair of bearings 62a and 62b, such as, for example, ball bearings. The bearings 62a and 62b are arranged on the outer peripheral side of the rotor 58. The bearing 62a is installed on the first case 56a, while the bearing 62b is installed on the second case 56b.

The stator 60 is arranged opposite to the rotor 58 on the outer peripheral side of the rotor 58. The stator 60 has a plurality of coils 60a arranged at a certain interval in the circumferential direction. The stator 60 is fixedly coupled to the inner peripheral portion of the first case 56a.

In the illustrated embodiment, the motor 30 is driven by an inverter (not shown). The inverter is driven by a controller (not shown). The controller controls the inverter based on the pedaling force and the speed of the bicycle.

In the illustrated embodiment, the rotational axes of the motor 30 and the crank axle 14 are coincident with each other. Thus, it is possible to simplify the internal mechanism of the motor 30. As a result, the drive unit 10 can be further simplified. However, of course, it will be apparent to those skilled in the art from this disclosure that the motor 30 and the crank axle 14 can be arranged with respect to each other such that the rotational axes the rotational axes of the motor 30 and the crank axle 14 are offset with respect to each other.

The gear shifting mechanism 32 is arranged on the power transmission passage between the third rotation transmitting member 26 and the torque combining mechanism 36. The gear shifting mechanism 32 has a shifting motor unit 32a. The gear shifting mechanism 32 has a gear shifting main body 32b. The shifting motor unit 32a rotates an actuating member of the gear shifting main body 32b to a prescribed phase upon receiving a shift operation from a shifter installed on a handle of the bicycle. The shifting motor unit 32a is a conventionally well-known motor unit, such as a motor unit disclosed in, for example. Japanese Patent No. 3529723. However, of course, it will be apparent to those skilled in the art from this disclosure that the shifting motor unit 32a can be replaced with a conventionally well-known mechanism for shifting the power transmission paths of the gear shifting main body 32b, such as a wire operated actuator operated by receiving a shift operation from a shifter installed on the handle of the bicycle.

The gear shifting main body 32b is a transmission unit that allows selection from a plurality of (e.g., 8) gear ratios. The configuration of the gear shifting main body 32b is basically identical to a conventionally well-known transmission unit, such as a transmission unit disclosed in U.S. Pat. No. 6,607,465 or U.S. Pat. No. 7,682,283, except for the configurations as described in detail below.

The gear shifting main body 32b of the gear shifting mechanism 32 mainly includes the support axle 22, the input part 64, a planetary gear unit 66, and an output part 68. The rotation of the third rotation transmitting member 26 is transmitted to the input part 64, the planetary gear unit 66 and the output part 68. The input part 64, the planetary gear unit 66 and the output part 68 are rotatably supported on the support axle 22, respectively. Specifically, the input part 64 is rotatably supported on the support axle 22 and operatively coupled to the crank axle 14. The second sprocket 26a of the third rotation transmitting member 26 is fixedly coupled to the input part 64 such that they can rotate together. The planetary gear unit 66 is disposed between the input part 64 and the output part 68. The planetary gear unit 66 selectively establishes a plurality of (e.g., 8) gear ratios. The output part 68 is rotatably supported on the support axle 22 and operatively coupled to the torque combining mechanism 36. The output part 68 outputs the rotation after changing the rotational speed by the planetary gear unit 66 to the torque combining mechanism 36.

The gear shifting mechanism 32 is arranged in the drive unit 10. It is possible to select from a plurality of gear ratios by the gear shifting mechanism 32. Consequently, assisting driving by the motor 30 can be carried out at a high efficiency. Also, even when an internal transmission unit is adopted as the gear shifting mechanism 32, as the force acting on the gear shifting mechanism 32 is small, the transmission operation can be carried out quickly. The configurations of the gear shifting mechanism 32 will be described in detail later.

The reduction gear unit 34 transmits the rotation of the rotor 58 of the motor 30 to a torque transmitting member 70. The reduction gear unit 34 has one or more gears. In the illustrated embodiment, the reduction gear unit 34 has a first planetary gear mechanism 72 and a second planetary gear mechanism 74. The first planetary gear mechanism 72 has a first sun gear 72a connected to the rotor 58, a plurality of first planetary gears 72b, a first carrier 72c rotatably supporting the first planetary gears 72b, and a first ring gear 72d fixedly coupled to the housing 12. The second planetary gear mechanism 74 has a second sun gear 74a connected to the first carrier 72c, a plurality of second planetary gears 74b, a second carrier 74c rotatably supporting the second planetary gears 74b, and a second ring gear 74d fixedly coupled to the housing 12. The rotational output of the reduction gear unit 34 is transmitted via the torque transmitting member 70 to the torque combining mechanism 36. The torque transmitting member 70 is integrally formed with the second carrier 74c. The torque transmitting member 70 is rotatably supported by a second gear member 78 of the torque combining mechanism 36. The torque transmitting member 70 supports a plurality of clutch pawls 80a of a one-way clutch 80.

The torque combining mechanism 36 transmits the rotating force of the motor 30 and the rotating force of the crank axle 14 to the front sprocket 28. The torque combining mechanism 36 is operatively coupled to the motor 30 and the crank axle 14 to combine the rotational outputs of the motor 30 and the crank axle 14. The torque combining mechanism 36 has a first gear member 76 fixedly coupled to the output part 68 of the gear shifting mechanism 32, a second gear member 78 that meshes with the first gear member 76, and the one-way clutch 80. The torque combining mechanism 36 is operatively connected to the rotor 58 (e.g., a rotational output portion) of the motor 30 through the one-way clutch 80 to receive the rotational output of the motor 30.

The second gear member 78 is rotatably supported on the housing 12 via the second bearing 39b on the housing 12. Between the inner peripheral portion of the second gear member 78 and the outer peripheral surface of the crank axle 14, a bearing 82 in the form of, for example, a ball bearing is installed. Consequently, the crank axle 14 is rotatably supported on the housing 12 via the second gear member 78.

The second gear member 78 has a first annular recess 78a in which the one-way clutch 80 is disposed and a second annular recess 78b in which the bearing 39b is disposed. The second gear member 78 of the torque combining mechanism 36 has a sprocket mounting portion 78c.

The first annular recess 78a is formed in annular shape on the surface of the housing 12 opposite to the second side wall 12b. The outer peripheral portion on the inner side of the first annular recess 78a rotatably supports the torque transmitting member 70. The second annular recess 78b is formed in annular shape on the surface opposite to the second side wall 12b. The inner ring of the second bearing 39b is disposed in the second annular recess 78b. The sprocket mounting portion 78c is configured to be operatively attached to the front sprocket 28 such that the front sprocket 28 rotates about the rotational axis X1 (e.g., a second rotational axis of a sprocket) in the forward rotational direction (e.g., a first direction) as the crank axle 14 rotates about the rotational axis X1 in the forward rotational direction. The sprocket mounting portion 78c extends in annular shape in the axial direction of the crank axle 14 from the outer peripheral surface on the inner side of the second annular recess 78b. In the second gear member 78, the second annular recess 78b is formed on the radially inner side of the first annular recess 78a. The front sprocket 28 is fixedly coupled to a connecting section 78d on the inner peripheral surface of the sprocket mounting portion 78c. The connecting section 78d can have serrations. The front sprocket 28 is pressed into the connecting section 78d and is fixed by caulking with a plastic deformation, for example. Thus, the second gear member 78 and the front sprocket 28 rotate together.

In the illustrated embodiment, the one-way clutch 80 only transmits the forward rotation of the motor 30 that drives the bicycle in the forward direction to the second gear member 78. On the other hand, the forward rotation of the second gear member 78 relative to the motor 30 is not transmitted to the motor 30. The one-way clutch 80 has a clutch pawl 80a, a clutch tooth 80b, and an inner side member 80c. The clutch pawl 80a is accommodated such that the clutch pawl 80a can pivot along the outer peripheral surface of the inner side member 80c between a release position and an engagement position. The clutch pawl 80a is biased towards the engagement position. The clutch tooth 80b is formed on the inner peripheral surface on the outer side of the first annular recess 78a. The inner side member 80c is formed in annular shape. The torque transmitting member 70 is rotatably supported on the inner peripheral portion of the inner side member 80c.

The front sprocket 28 has an annular section 28b with sprocket teeth 28a formed on the outer peripheral portion, and a cylindrical section 28c integrally formed on the inner peripheral portion of the annular section 28b. The outer peripheral surface of the cylindrical section 28c is pressed into the inner peripheral portion of the second annular recess 78b, and the tip portion of the cylindrical section 28c is fixed by caulking. However, the method for fixing the front sprocket 28 is not limited to the press-fit. The front sprocket 28 can be fixed to the second gear member 78 by any other suitable manner, such as screwing, bonding, fusion welding, etc. The front sprocket 28 rotates about the rotational axis X1 of the crank axle 14. Thus, the rotational axis of the crank axle 14 (e.g., a first rotational axis) and the rotational axis of the front sprocket 28 (e.g., a second rotational axis) are coincident with each other. However, of course, it will be apparent to those skilled in the art from this disclosure that front sprocket 28 and the crank axle 14 can be arranged with respect to each other such that the rotational axes of the front sprocket 28 and the crank axle 14 are offset with respect to each other.

Figure 3:
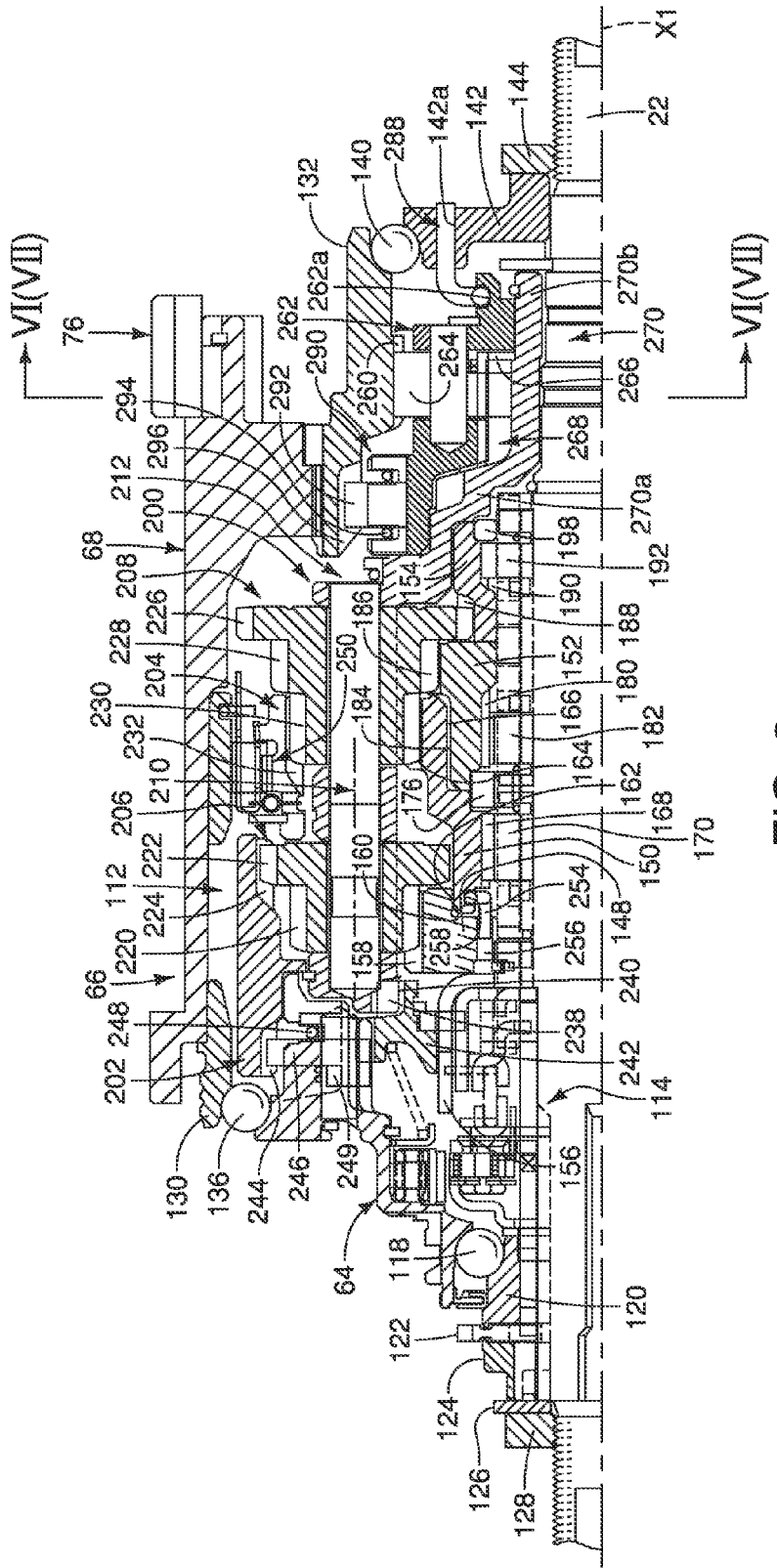
FIG. 3 is an enlarged cross-sectional view of a gear shifting mechanism of the drive unit illustrated in FIG. 2.

Referring now to FIG. 3, the configuration of the gear shifting mechanism 32 will be further described in detail. As shown in FIG. 3, the planetary gear unit 66 of the gear shifting mechanism 32 includes a power transmitting mechanism 112 and a shift/assist mechanism 114. The power transmitting mechanism 112 is disposed between the input part 64 and the output part 68 for communicating rotational power from the input part 64 to the output part 68 through a plurality of power transmission paths. The shift/assist mechanism 114 controls the selection of the power transmission paths by receiving the rotational input from the shifting motor unit 32a.

The input part 64 is rotatably supported on the support axle 22 through a ball bearing 118 and a bearing cone 120. The bearing cone 120 is maintained in place by an actuator plate 122, a spacer 124, a washer 126 and a lock nut 128.

The output part 68 has a left cup 130 and a right cup 132. The left cup 130 is non-rotatably fitted at the left side of an inner peripheral surface of the output part 68, while the right cup 132 is non-rotatably fitted at the right side of the inner peripheral surface of the output part 68. The left cup 130 rotatably supports the output part 68 relative to the input part 64 through ball bearings 136. The right cup 132 rotatably supports the output part 68 on the support axle 22 through a ball bearing 140 and a cone 142. The cone 142 is maintained on the support axle 22 by a stop nut 144. In the illustrated embodiment, the left cup 130 and the right cup 132 are independently formed as separate members from the output part 68. However, the left cup 130 or the right cup 132 can be integrally formed with the output part 68 as a one-piece, unitary member.

The power transmitting mechanism 112 includes a first sun gear 148, a separate second sun gear 150, a separate third sun gear 152, and a separate fourth sun gear 154. The first sun gear 148 is non-rotatably supported to the support axle 22. The first sun gear 148 includes a clutch cam portion 156, and a plurality of first sun gear teeth 158 (e.g., 48T) formed on an outer peripheral surface thereof, and an inner peripheral second sun gear contact surface 160. The second sun gear 150 is rotatably supported around the support axle 22 adjacent to the first sun gear 148. The second sun gear 150 includes an outer peripheral first sun gear contact surface 162 for slidably contacting the second sun gear contact surface 160 on the first sun gear 148, a plurality of second sun gear ratchet teeth 168 (e.g., 12T) formed on an inner peripheral surface thereof for engaging a second sun gear pawl 170, an inner peripheral third sun gear contact surface 166, and a plurality of second sun gear teeth 164 (e.g., 48T) formed on an outer peripheral surface thereof. The second sun gear 150 further has an inner peripheral guide ring contact surface for slidably contacting an outer peripheral surface of a sun gear guide ring 176. The third sun gear 152 is rotatably supported around the support axle 22 adjacent to the second sun gear 150. The third sun gear 152 includes an inner peripheral first guide ring contact surface for slidably contacting the outer peripheral surface of the sun gear guide ring 176. The third sun gear 152 includes a plurality of third sun gear ratchet teeth 180 (e.g., 12T) formed on an inner peripheral surface thereof for engaging a third sun gear pawl 182, an outer peripheral second sun gear contact surface 184 for slidably contacting the third sun gear contact surface 166 of the second sun gear 150, and a plurality of third sun gear teeth 186 (e.g., 42T) formed on an outer peripheral surface thereof. The fourth sun gear 154 includes a plurality of fourth sun gear teeth 188 (e.g., 36T) formed on an outer peripheral surface thereof, a plurality of fourth sun gear ratchet teeth 190 (e.g., 12T) formed on an inner peripheral surface thereof for engaging a fourth sun gear pawl 192. The fourth sun gear 154 includes an inner peripheral guide ring contact surface for slidably contacting an outer peripheral surface of a guide ring 198.

The pawls 170, 182 and 192 are pivotally coupled to the support axle 22, and controlled by a shift control sleeve (not shown) for selectively switching between a free state and a lock state of the second, third and fourth sun gears 150, 152 and 154 in a conventional manner. Each of the second, third and fourth sun gears 150, 152 and 154 rotates about the support axle 22 in the free state, while each of the second, third and fourth sun gears 150, 152 and 154 is prevented from rotating about the support axle 22 in the lock state. With this switching of the states, one of the power transmission paths from the input part 64 to the output part 68 are selected. The configurations and the operations of the shift control sleeve are conventionally well known in U.S. Pat. Nos. 6,607,465 and 7,682,283, for example. Thus, the detailed configurations will be omitted for the sake of brevity.

As shown in FIG. 3, the power transmitting mechanism 112 further includes a planetary gear carrier 200, a first ring gear 202, a second ring gear 204, a plurality of (e.g., three) first planet gears 206, and a plurality of (e.g., three) second planetary gears 208.

The planetary gear carrier 200 is rotatably mounted around the support axle 22. The planetary gear carrier 200 rotatably supports the first planetary gears 206 about a plurality of (e.g., three) first pinion pins 210, and rotatably supports the second planetary gears 208 about a plurality of (e.g., three) second pinion pins 212. The first and second pinion pins 210 and 212 are fixedly coupled to the planetary gear carrier 200. Specifically, the first pinion pins 210 are equidistantly arranged on the planetary gear carrier 200 in the circumferential direction about the support axle 22, while the second pinion pins 212 are equidistantly arranged on the planetary gear carrier 200 in the circumferential direction about the support axle 22. Each of the first pinion pins 210 is concentrically arranged with respect to respective one of the second pinion pins 212. In the illustrated embodiment, the first and second pinion pins 210 and 212 are independently formed as separate members. However, the first and second pinion pins 210 and 212 that are concentrically disposed can be integrally formed as a one-piece, unitary member. The planetary gear carrier 200 is made of a light alloy metal such as an aluminum alloy, steel, or any other suitably material. Furthermore, the planetary gear carrier 200 can be formed by combining a plurality of separate parts.

The first pinion pins 210 rotatably support the first planetary gears 206, respectively. Each of the first planetary gears 206 has a small diameter gear portion 220 (e.g., 14T) engaging with the first sun gear teeth 158 of the first sun gear 148, and a large diameter gear portion 222 (e.g., 22T) engaging with a first inner peripheral gear portion 224 (e.g., 84T) of the first ring gear 202. Similarly, the second pinion pins 212 rotatably support the second planetary gears 208, respectively. Each of the second planetary gears 208 includes a large diameter gear portion 226 (e.g., 29T) engaging with the fourth sun gear teeth 188 of the fourth sun gear 154, an intermediate diameter gear portion 228 (e.g., 18T) engaging with the third sun gear teeth 186 of the third sun gear 152, and a small diameter gear portion 230 (e.g., 14T) engaging with the second sun gear teeth 164 of second sun gear 150 and an inner peripheral gear portion 232 (e.g., 78T) of the second ring gear 204.

The planetary gear carrier 200 further has a plurality (e.g., 12) of splines 238 on an inner peripheral surface of a left end portion of the planetary gear carrier 200. The clutch engaging splines 238 of the planetary gear carrier 200 are selectively engaged with a plurality of splines 240 circumferentially disposed on a clutch ring 242. In particular, the clutch ring 242 is slidable along a center axis of the support axle 22 between an engaging position and a disengaging position in response to the rotational input from the shifting motor unit 32a. The clutch ring 242 is non-rotatably coupled to splines on an inner peripheral surface of the input part 64. Thus, the clutch ring 242 couples the input part 64 with the planetary gear carrier 200 when the clutch ring 242 is located on the engaging position such that the input part 64 and the planetary gear carrier 200 rotate together. On the other hand, the input part 64 is disengaged from the planetary gear carrier 200 when the clutch ring 242 is located on the disengaging position.

The first ring gear 202 further includes a second inner peripheral gear portion 244 (e.g., 36T) for engaging a plurality of circumferentially disposed pawls 246 that are pivotally mounted to an outer peripheral surface of the input part 64. The pawls 246 are biased radially outwardly by a pawl spring 248 and thus function as a clutch between the input part 64 and the first ring gear 202. A plurality of pawls 249 also are circumferentially disposed on the outer peripheral surface of the input part 64 for driving the first ring gear 202 in response to the rearward rotation of the crank axle 14 in a conventionally well-known manner.

The second ring gear 204 is coupled to the output part 68 via a one-way clutch 250 in the form of a roller clutch having a plurality of (e.g., 18) rollers and cam surfaces. The one-way clutch 250 is configured such that the one-way clutch 250 only transmits the forward rotation of the crank axle 14 to the output part 68.

Figure 5:
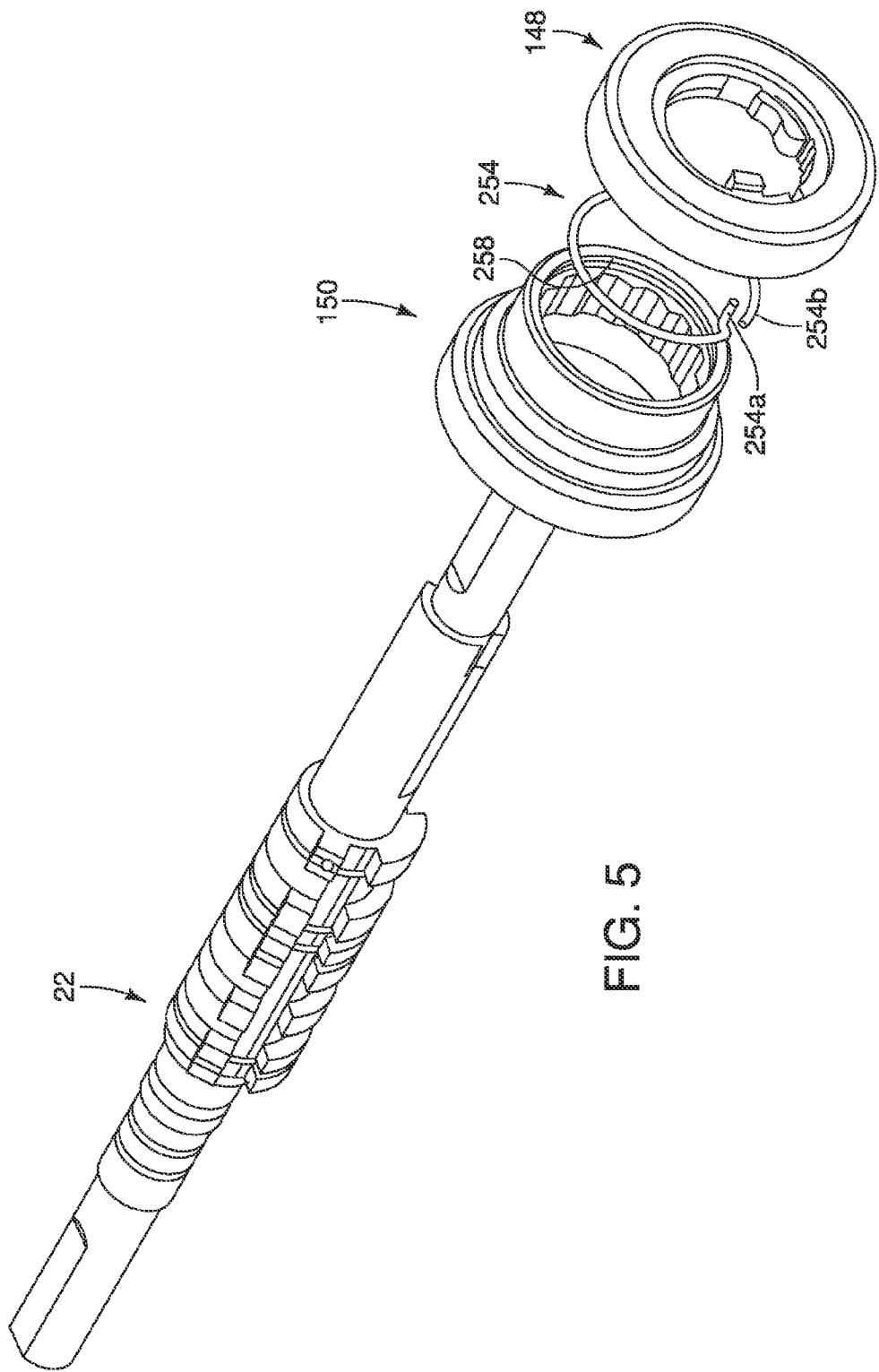
FIG. 5 is an exploded perspective view of first and second sun gears of the gear shifting mechanism of the drive unit illustrated in FIG. 2.

In the illustrated embodiment, the power transmitting mechanism 112 of the planetary gear unit 66 further includes a slide spring 254 disposed between the first and second sun gears 148 and 150. In other words, the power transmitting mechanism 112 of the planetary gear unit 66 includes the first and second sun gears 148 and 150 that are operatively connected by the slide spring 254. As shown in FIGS. 5, 8 and 9, the slide spring 254 has a leg portion 254*a* and a ring portion 254*b*. As shown in FIG. 3, the leg portion 254*a* is disposed in a receiving hole 256 of the first sun gear 148. The ring portion 254*b* extends from the leg portion 254*a* and is disposed in an inner circumferential groove 258 of the second sun gear 150. Specifically, the ring portion 254*b* has a larger diameter than that of the inner circumferential groove 258 of the second sun gear 150 when the slide spring 254 is in an unloaded state as shown in FIGS. 8 and 9. Thus, the ring portion 254*b* of the slide spring 254 is in a loaded state while the ring portion 254*b* is disposed in the inner circumferential groove 258 of the second sun gear 150 as shown in FIG. 3. In particular, the leg portion 254*a* of the slide spring 254 is disposed in the receiving hole 256 of the first sun gear 148 such that the slide spring 254 is non-rotatably coupled to the first sun gear 148. On the other hand, the ring portion 254*b* of the slide spring 254 is slidably disposed in the inner circumferential groove 258 of the second sun gear 150 while the slide spring 254 is in the loaded state. Thus, the angular position of the second sun gear 150 about the support axle 22 with respect to the first sun gear 148 is maintained by the slide spring 254 while the rotational force applied to the second sun gear 150 is smaller than the retaining or friction force between the ring portion 254*b* of the slide spring 254 and the inner circumferential groove 258 of the second sun gear 150. On the other hand, the second sun gear 150 rotates with respect to the first sun gear 148 when the rotational force applied to the second sun gear 150 becomes larger than the retaining or friction force between the ring portion 254*b* of the slide spring 254 and the second sun gear 150.

Figure 4:
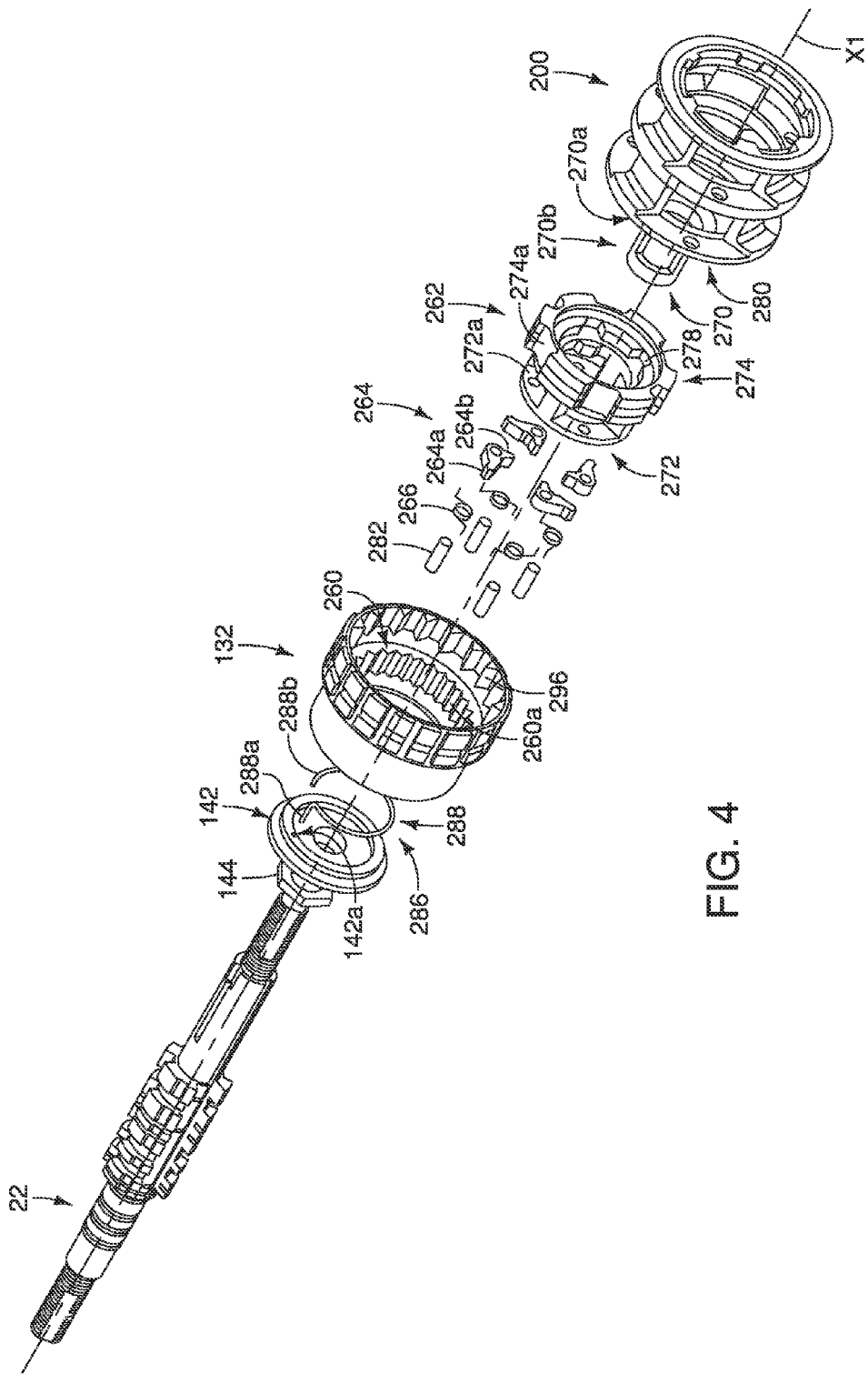
FIG. 4 is an exploded perspective view of a clutch mechanism of the drive unit illustrated in FIG. 2.

Referring now to FIGS. 2 to 4, the configuration of the clutch mechanism 38 will be described in detail. The clutch mechanism 38 is operatively disposed between the crank axle 14 and the front sprocket 28. The clutch mechanism 38 is configured to rotate the front sprocket 28 about the rotational axis X1 in the rearward rotational direction (e.g., a second direction) as the crank axle 14 rotates about the rotational axis X1 in the rearward rotational direction. The rearward rotational direction is opposite the forward rotational direction. The clutch mechanism 38 permits a relative rotation between the crank axle 14 and the front sprocket 28 in the forward rotational direction (e.g., the first direction). The clutch mechanism 38 is supported to the support axle 22 of the gear shifting mechanism 32 such that the clutch mechanism 38 is operatively disposed between the planetary gear carrier 200 of the planetary gear unit 66 and the output part 68 of the gear shifting mechanism 32. The clutch mechanism 38 includes a toothed part 260 (e.g., an internally toothed part), a pawl support 262, a plurality of engagement pawls 264, and a plurality of biasing members 266. The clutch mechanism 38 includes a control part 268.

The toothed part 260 is disposed on an inner peripheral surface of the right cup 132 of the output part 68 of the gear shifting mechanism 32. The toothed part 260 has a plurality of engagement teeth 260*a* formed on the inner peripheral surface of the right cup 132. The engagement teeth 260*a* selectively engage with the engagement pawls 264 for transmitting the rearward rotation of the crank axle 14 to the output part 68.

The pawl support 262 is movably attached to the planetary gear carrier 200 of the planetary gear unit 66. Specifically, the pawl support 262 is movably attached about an axially extending portion 270 of the planetary gear carrier 200 that has a large diameter section 270*a* and a small diameter section 270*b*. The pawl support 262 is integrally formed as a one-piece, unitary member, and is made of metallic material, or any other suitable material. The pawl support 262 has first and second annular sections 272 and 274 that are axially arranged with respect to each other. The first annular section 272 has a plurality of (e.g., four) pawl receiving openings 272*a* that are circumferentially arranged on an outer peripheral surface of the first annular section 272. The second annular section 274 has a plurality of clutch pawl mounting sections 274*a* that are circumferentially arranged on an outer peripheral surface of the second annular section 274.

The second annular section 274 of the pawl support 262 has a plurality of recesses 278 disposed in the circumferential direction of the pawl support 262. In particular, the recesses 278 are circumferentially arranged on an inner peripheral surface of the second annular section 274. The planetary gear carrier 200 of the planetary gear unit 66 has a plurality of projections 280. In particular, the projections 280 are circumferentially arranged on an outer peripheral surface of the large diameter section 270*a* of the axially extending portion 270 of the planetary gear carrier 200. The projections 280 are located in the recesses 278, respectively. As shown in FIGS. 6 and 7, the recesses 278 and the projections 280 are arranged relative to each other with circumferential spacings therebetween, respectively, to provide a limited range of relative rotation between the pawl support 262 and the planetary gear carrier 200. In the illustrated embodiment, as shown in FIG. 6, the projections 280 have first contact surfaces 280*a* (e.g., contact surfaces), respectively, that circumferentially contact with first inside surfaces 278*a* (e.g., inside surfaces) of the recesses 278, respectively, as the crank axle 14 rotates in the forward rotational direction such that the forward rotation of the crank axle 14 in the forward rotational direction is transmitted from the planetary gear carrier 200 of the planetary gear unit 66 to the output part 68 of the gear shifting mechanism 32 via the pawl support 262. Furthermore, as shown in FIG. 7, the projections 280 have second contact surfaces 280*b*, respectively, that circumferentially contact with second inside surfaces 278*b* of the recesses 278, respectively, as the crank axle 14 rotates in the rearward rotational direction such that the rearward rotation of the crank axle 14 in the forward rotational direction is transmitted from the planetary gear carrier 200 of the planetary gear unit 66 to the output part 68 of the gear shifting mechanism 32 via the pawl support 262. The first and second contact surfaces 280*a* and 280*b* of each of the projections 280 face in the opposite circumferential directions, while the first and second inside surfaces 278*a* and 278*b* of each of the recesses 278 face in the opposite circumferential directions.

In the illustrated embodiment, the pawl support 262 has the recesses 278, while the planetary gear carrier 200 has the projections 280. However, alternatively, the pawl support 262 can have a plurality of projections disposed in the circumferential directions of the pawl support 262, while the planetary gear carrier 200 of the planetary gear unit 66 can have a plurality of recesses located in the recesses. In this case, the recesses and the projections can be arranged relative to each other with circumferential spacings therebetween, respectively, to provide a limited range of relative rotation between the pawl support 262 and the planetary gear carrier 200.

As shown in FIGS. 3, 4, 6 and 7, the engagement pawls 264 are movably mounted to the pawl support 262 between a release position and an engagement position. Each of the engagement pawls 264 has an engagement end 264*a* and a control end 264*b*. The engagement ends 264*a* of the engagement pawls 264 are engaged with the engagement teeth 260*a* of the right cup 132 when the engagement pawls 264 are located at the engagement position, while the engagement ends 264a of the engagement pawls 264 are disengaged from the engagement teeth 260a of the right cup 132 when the engagement pawls 264 are located at the release position. The engagement pawls 264 are pivotally arranged in the pawl receiving openings 272a of the first annular section 272 of the pawl support 262, respectively. More specifically, the engagement pawls 264 are pivotally coupled to a plurality of pivot pins 282, respectively. The pivot pins 282 are fixedly coupled to the first annular section 272 of the pawl support 262 in the pawl receiving openings 272a, respectively.

The biasing members 266 bias the engagement pawls 264 towards the engagement position. The biasing members 266 basically includes pawl springs operatively disposed between the engagement pawls 264 and the pawl support 262.

The control part 268 is disposed on an outer peripheral surface of the planetary gear carrier 200 of the planetary gear unit 66. The control part 268 selectively causes the engagement pawls 264 to engage with the toothed part 260 as the crank axle 14 rotates in the rearward rotational direction such that the clutch mechanism 38 transmits the rearward rotation of the crank axle 14 to the output part 68 of the gear shifting mechanism 32. Specifically, as shown in FIGS. 6 and 7, the control part 268 has a plurality of control projections 284 circumferentially arranged on an outer peripheral surface of the small diameter section 270b of the axially extending portion 270 of the planetary gear carrier 200. In particular, as shown in FIG. 6, the control projections 284 are engaged with the control ends 264b of the engagement pawls 264 while the planetary gear carrier 200 rotates in response to the forward rotation of the crank axle 14. This moves the engagement pawls 264 towards the release position such that the rotation of the planetary gear carrier 200 is prevented from being transmitted to the right cup 132 of the output part 68 via the engagement pawls 264. On the other hand, as shown in FIG. 7, the control projections 284 are disengaged with the control ends 264b of the engagement pawls 264 while the planetary gear carrier 200 rotates in response to the rearward rotation of the crank axle 14. This moves the engagement pawls 264 back to the engagement position due to the biasing force of the biasing members 266 such that the rotation of the planetary gear carrier 200 is transmitted to the right cup 132 of the output part 68 via the engagement pawls 264. More specifically, as shown in FIG. 7, this rotation of the planetary gear carrier 200 is transmitted to the pawl support 262 via the connections between the projections 280 of the planetary gear carrier 200 and the recesses 278 of the pawl support 262, and then the rotation of the pawl support 262 is transmitted to the right cup 132 of the output part 68 via the engagement pawls 264.

The clutch mechanism 38 further includes a retaining member 286 operatively disposed between the support axle 22 and the pawl support 262. The retaining member 286 maintains relative angular position between the pawl support 262 and the support axle 22 before the engagement pawls 264 engage with the right cup 132 of the output part 68. As shown in FIGS. 4, 10 and 11, the retaining member 286 of the clutch mechanism 38 further includes a slide spring 288 having a leg portion 288a and a ring portion 288b. The leg portion 288a is non-rotatably coupled to the cone 142 that is fastened to the support axle 22 of the gear shifting mechanism 32. The ring portion 288b extends from the leg portion 288a and is disposed in an outer circumferential groove 262a of the pawl support 262 of the clutch mechanism 38. Specifically, the ring portion 288b has a smaller diameter than that of the outer circumferential groove 262a of the pawl support 262 when the slide spring 288 is in an unloaded state, as shown in FIG. 11. Thus, the ring portion 288b of the slide spring 288 is in a loaded state, as shown in FIG. 10, while the ring portion 288b is disposed in the outer circumferential groove 262a of the pawl support 262. In particular, the leg portion 288a of the slide spring 288 is disposed in a receiving hole 142a of the cone 142 such that the slide spring 288 is non-rotatably coupled to the support axle 22. On the other hand, the ring portion 288b of the slide spring 288 is slidably disposed in the outer circumferential groove 262a of the pawl support 262 while the slide spring 288 is in the loaded state. Thus, the angular position of the pawl support 262 about the support axle 22 is maintained by the slide spring 288 while the rotational force applied to the pawl support 262 is smaller than the retaining or friction force between the ring portion 288b of the slide spring 288 and the outer circumferential groove 262a of the pawl support 262. On the other hand, the pawl support 262 rotates with respect to the support axle 22 when the rotational force applied to the pawl support 262 becomes larger than the retaining or friction force between the ring portion 288b of the slide spring 288 and the outer circumferential groove 262a of the pawl support 262.

The clutch mechanism 38 further includes a one-way clutch 290. The one-way clutch 290 is operatively disposed between the pawl support 262 and the right cup 132 of the output part 68 for transmitting the forward rotation of the crank axle 14 to the output part 68. Specifically, the one-way clutch 290 has a plurality of clutch pawls 292 pivotally supported on the clutch pawl mounting sections 274a of the pawl support 262. The clutch pawls 292 are biased radially outwardly by a plurality of pawl springs 294 for engaging inner peripheral clutch teeth 296 formed on the inter peripheral surface of the left side of the right cup 132. The clutch pawls 292 transmit the forward rotation of the crank axle 14 to the right cup 132 and hence to the output part 68. In particular, as shown in FIG. 6, the control projections 284 are engaged with the control ends 264b of the engagement pawls 264 while the planetary gear carrier 200 rotates in response to the forward rotation of the crank axle 14. This rotation of the planetary gear carrier 200 is prevented from being transmitted to the right cup 132 of the output part 68 via the engagement pawls 264. However, as shown in FIG. 6, this rotation of the planetary gear carrier 200 is transmitted to the pawl support 262 via the connections between the projections 280 of the planetary gear carrier 200 and the recesses 278 of the pawl support 262, and then the rotation of the pawl support 262 is transmitted to the right cup 132 of the output part 68 via the one-way clutch 290.

In the illustrated embodiment, the toothed part 260 is disposed on the output part 68 of the gear shifting mechanism 32, while the pawl support 262 is movably attached to the planetary gear carrier 200 of the planetary gear unit 66. However, alternatively, the toothed part 260 can be disposed on the planetary gear carrier of the planetary gear unit 66, while the pawl support 262 is movably attached to the output part 68 of the gear shifting mechanism 32.

With this drive unit 10, as shown in FIG. 2, the torque generated by the pedaling force in the forward rotational direction is transmitted in the following transmission passage: the crank arms 101→the crank axle 14→the first rotation transmitting member 16→the second rotation transmitting member 20→the third rotation transmitting member 26→the gear shifting main body 32b—the first gear member 76→the second gear member 78. On the other hand, the output torque of the motor 30 is transmitted in the following path: the reduction gear unit 34→the torque transmitting member 70→the one-way clutch 80→the second gear member 78. The second gear member 78 combines these two torques to transmit them to the front sprocket 28. Thus, the forward rotation of the crank arms 101 is transmitted to the front sprocket 28 after being assisted by the motor 30. In the gear shifting main body 32b, the planetary gear unit 66 transmits the forward rotation of the crank axle 14 through a plurality of power transmission paths. This shifting operation for selecting one of the power transmission paths is conventionally well known in U.S. Pat. Nos. 6,607,465 and 7,682,283, for example. Thus, the detailed configurations will be omitted for the sake of brevity.

On the other hand, with this drive unit 10, the rearward rotation of the crank arms 101 is also transmitted to the front sprocket 28 to rotate the front sprocket 28 in the rearward rotational direction. Specifically, the torque generated by the pedaling force in the rearward rotational direction is transmitted in the following transmission passage: the crank arms 101→the crank axle 14→the first rotation transmitting member 16→the second rotation transmitting member 20→the third rotation transmitting member 26→the gear shifting main body 32b→the first gear member 76→the second gear member 78→the front sprocket 28. Specifically, in the gear shifting main body 32b, when the rearward rotation of the crank arms 101 is transmitted to the input part 64 of the gear shifting main body 32b, the clutch ring 242 is disengaged from the planetary gear carrier 200 no matter which of the power transmission paths is selected. Then, the rotation of the input part 64 is transmitted to the output part 68 through the following transmission path: the input part 64→the pawls 249→the first ring gear 202→the planetary gear carrier 200→the engagement pawls 264→the right cup 132→the output part 68. Thus, the rearward rotation of the crank arms 101 is transmitted to the front sprocket 28 to rotate the front sprocket 28 in the rearward rotational direction, thereby operating the coaster brake 104a of the rear hub 104.

With this drive unit 10, the gear shifting main body 32b includes the retaining member 286 that maintains the relative angular position between the support axle 22 and the pawl support 262. As shown in FIG. 6, the planetary gear carrier 200 and the pawl support 262 rotates together in the clockwise direction while maintaining the engagement pawls 264 at the release position. In response to the rearward rotation of the clank arms 101 for operating the coaster brake 104a, the planetary gear carrier 200 starts to rotate in the counter-clockwise direction in FIG. 6. If the pawl support 262 starts to rotate together with the planetary gear carrier 200 in the counter-clockwise direction in FIG. 6 in response to the rearward rotation of the clank arms 101, the engagement pawls 264 do not engage with the toothed part 260 as shown in FIG. 6. However, with this drive unit 10, the retaining member 286 maintains the relative angular position between the support axle 22 and the pawl support 262 until the rotational force applied to the pawl support 262 becomes larger than the retaining or friction force between the slide spring 288 of the retaining member 286 and the pawl support 262. Thus, the retaining member 286 allows the planetary gear carrier 200 to relatively rotate with respect to the pawl support 262 in response to the rearward rotation of the crank arms 101, and prevents the pawl support 262 from rotating together with the planetary gear carrier 200 in the counter-clockwise direction until the positional relationship between the planetary gear carrier 200 and the pawl support 262 transitions from the positional relationship shown in FIG. 6 to the positional relationship shown in FIG. 7. Thus, with this drive unit 10, the engagement pawls 264 of the clutch mechanism 38 can be properly operated in response to the rearward rotation of the crank arms 101.

With this drive unit 10, the gear shifting main body 32b includes the slide spring 254 that maintains the relative angular position between the first and second sun gears 148 and 150. While the crank arms 101 rotate in the forward rotational direction, the one-way clutch 250 engages the second ring gear 204 and the output part 68. Furthermore, if the rotation of the crank arms 101 is stopped, the one-way clutch 250 still engages the second ring gear 204 and the output part 68. In this case, if the engagement pawls 264 becomes engaged with the toothed part 260 of the right cup 132 of the output part 68 before the one-way clutch 250 becomes disengaged in response to the rearward rotation of the crank arms 101 for operating the coaster brake 104a, then the gear shifting mechanism 32 may be locked up since both of the clutch mechanism 38 and the one-way clutch 250 are engaged with the output part 68. However, with this drive unit 10, the slide spring 254 maintains the relative angular position between the first and second sun gears 148 and 150 until the rotational force applied to the second sun gear 150 becomes larger than the retaining or friction force between the slide spring 254 and the second sun gear 150. Thus, in response to the rearward rotation of the crank arms 101, the second planetary gears 208 is first rotated while the second sun gear 150 meshed with the second planetary gears 208 is stationary with respect to the first sun gear 148, which also rotates the second ring gear 204 for disengaging the one-way clutch 250. After the one-way clutch 250 is disengaged, the engagement pawls 264 become engaged with the toothed part 260 of the right cup 132 of the output part 68. Therefore, the slide spring 254 prevents both of the clutch mechanism 38 and the one-way clutch 250 from being engaged with the output part 68 in response to the rearward rotation of the crank arms 101, which prevents the gear shifting mechanism 32 from being locked up. Thus, the coaster brake 104a can be properly operated in response to the rearward rotation of the crank arms 101.

In the illustrated embodiment, the first rotation transmitting member 16, the second rotation transmitting member 20, and the third rotation transmitting member 26 can be made of any appropriate parts selected from the group of gears, sprockets, and pulleys.

In the illustrated embodiment, the bearings are ball bearings or needle-shaped roller bearings. However, it will be apparent to those skilled in the art from this disclosure that any types of bearings that allow the members to be rotatably installed can be adopted. For example, in addition to the ball bearings and the needle-shaped roller bearings, other types of roller bearings, as well as bushes or other sliding-type bearings, can also be applied to the illustrated embodiment.

Second Embodiment

Figure 12:
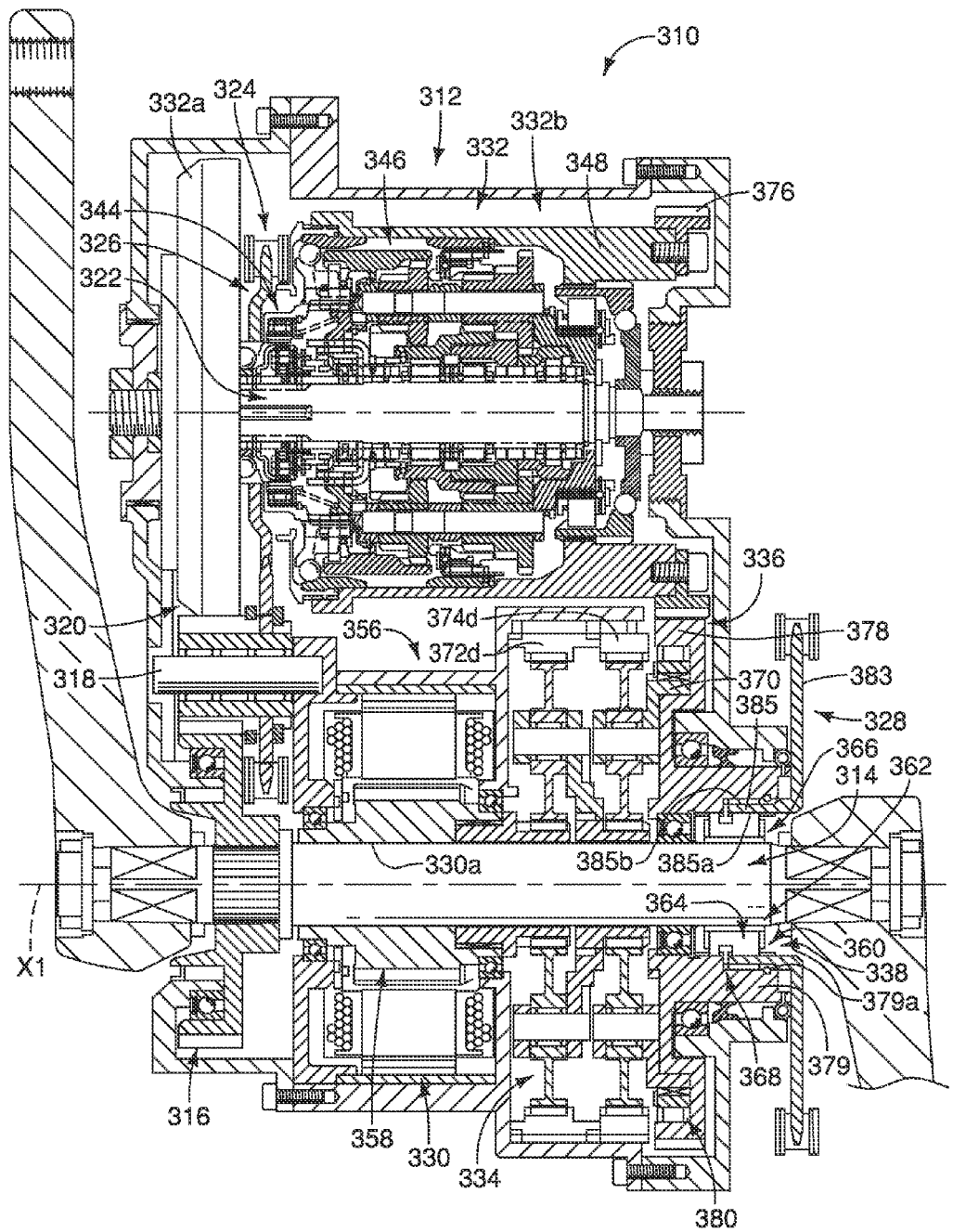
FIG. 12 is a cross-sectional view illustrating a drive unit in accordance with a second embodiment.

Referring now to FIG. 12, a drive unit 310 in accordance with a second embodiment will now be explained.

In view of the similarity between the first and second embodiments, the parts of the second embodiment that are identical to the parts of the first embodiment will be given the same reference numerals as the parts of the first embodiment. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

Basically, the drive unit 310 is arranged in a vicinity of the crank arms 101 (see FIG. 1). In the illustrated embodiment, as shown in FIG. 12, the drive unit 310 has a housing 312, a crank axle 314, a first rotation transmitting member 316, an intermediate axle 318, a second rotation transmitting member 320, a support axle 322, a second chain 324, a third rotation transmitting member 326 and a front sprocket 328 (e.g., a sprocket). In the illustrated embodiment, the crank axle 314, the intermediate axle 318 and the support axle 322 are arranged to extend parallel to each other at spaced locations. As shown in FIG. 12, the drive unit 310 has a motor 330, a gear shifting mechanism 332, a reduction gear unit 334, a torque combining mechanism 336, and a clutch mechanism 338. Thus, the bicycle drive unit 310 includes the motor 330, the crank axle 314, the torque combining mechanism 336, and the clutch mechanism 338.

In the illustrated embodiment, the housing 312, the crank axle 314, the first rotation transmitting member 316, the intermediate axle 318, the second rotation transmitting member 320, the support axle 322, the second chain 324, the third rotation transmitting member 326, the motor 330, the reduction gear unit 334, the torque combining mechanism 336 are basically identical to the housing 12, the crank axle 14, the first rotation transmitting member 16, the intermediate axle 18, the second rotation transmitting member 20, the support axle 22, the second chain 24, the third rotation transmitting member 26, the motor 30, the reduction gear unit 34, the torque combining mechanism 36 in accordance with the first embodiment, except for minor changes. Thus, the detailed descriptions of these components will be omitted for the sake of brevity.

In the illustrated embodiment, the crank axle 314 is rotatable about a rotational axis X1 (e.g., a first rotational axis). The motor 330 includes a crank axle receiving hole 330a. The crank axle 314 is rotatably disposed in the crank axle receiving hole 330a of the motor 330.

The gear shifting mechanism 332 is arranged on the power transmission passage between the third rotation transmitting member 326 and the torque combining mechanism 336. The gear shifting mechanism 332 has a shifting motor unit 332a. The gear shifting mechanism 332 has a gear shifting main body 332b. The shifting motor unit 332a rotates an actuating member of the gear shifting main body 332b to a prescribed phase upon receiving a shift operation from a shifter installed on a handle of the bicycle. The shifting motor unit 332a is identical to the shifting motor unit 32a in accordance with the first embodiment. Thus, the detailed descriptions will be omitted for the sake of brevity.

The gear shifting main body 332b is a transmission unit that allows selection from a plurality of (e.g., 8) gear ratios. The configuration of the gear shifting main body 332b is basically identical to a conventionally well-known transmission unit, such as a transmission unit disclosed in Japanese Utility Model Registration No. 3146138. Thus, the detailed descriptions will be omitted for the sake of brevity. In the illustrated embodiment, the gear shifting main body 332b of the gear shifting mechanism 332 includes the support axle 322, an input part 344, a planetary gear unit 346, and an output part 348. The rotation of the third rotation transmitting member 326 is transmitted to the input part 344, the planetary gear unit 346 and the output part 348. The input part 344, the planetary gear unit 346 and the output part 348 are rotatably supported on the support axle 322, respectively. Specifically, the input part 344 is rotatably supported on the support axle 322 and operatively coupled to the crank axle 314. The third rotation transmitting member 326 is fixedly coupled to the input part 344 such that they can rotate together. The planetary gear unit 346 is disposed between the input part 344 and the output part 348. The planetary gear unit 346 selectively establishes a plurality of (e.g., 8) gear ratios. The output part 348 is rotatably supported on the support axle 322 and operatively coupled to the torque combining mechanism 336. The output part 348 outputs the rotation after changing the rotational speed by the planetary gear unit 346 to the torque combining mechanism 336.

The reduction gear unit 334 is also identical to the reduction gear unit 34, except for first and second ring gears 372d and 374d are coupled to an inner peripheral surface of an axially extending portion of a motor case 356. Thus, the detailed configurations will be omitted for the sake of brevity.

The torque combining mechanism 336 is operatively coupled to the motor 330 and the crank axle 314 to combine rotational outputs of the motor 330 and the crank axle 314. The torque combining mechanism 336 has a first gear member 376 fixedly coupled to the output part 348 of the gear shifting mechanism 332, a second gear member 378 that meshes with the first gear member 376, and a one-way clutch 380. The torque combining mechanism 336 is operatively connected to a rotor 358 (e.g., a rotational output portion) of the motor 330 through the one-way clutch 380 to receive the rotational output of the motor 330.

The second gear member 378 is basically identical to the second gear member 78, except that the front sprocket 328 is movably attached to the second gear member 378. Thus, the detailed description will be omitted for the sake of brevity. As shown in FIG. 12, the second gear member 378 of the torque combining mechanism 336 has a sprocket mounting portion 379 that is configured to be operatively attached to the front sprocket 328 (e.g., a sprocket) such that the front sprocket 328 rotates about the rotational axis X (e.g., a second rotational axis of a sprocket) in the forward rotational direction (e.g., a first direction) as the crank axle 314 rotates about the rotational axis X1 in the forward rotational direction.

The clutch mechanism 338 is operatively disposed between the crank axle 314 and the front sprocket 328. The clutch mechanism 338 is configured to rotate the front sprocket 328 about the rotational axis X1 (e.g., a second rotational axis) in the rearward rotational direction (e.g., a second direction) as the crank axle 314 rotates about the rotational axis X1 in the rearward rotational direction. The rearward rotational direction is opposite the forward rotational direction. The clutch mechanism 338 permits a relative rotation between the crank axle 314 and the front sprocket 328 in the forward rotational direction (e.g., the first direction). In the illustrated embodiment, the clutch mechanism 338 is supported on the crank axle 314 between the crank axle 314 and the front sprocket 328. However, alternatively, the clutch mechanism 338 can also be supported on the front sprocket 328 or the torque combining mechanism 336 between the crank axle 314 and the front sprocket 328. The clutch mechanism 338 includes a toothed part 360 (e.g., an internally toothed part), a pawl support 362, a plurality of engagement pawls 364, a plurality of biasing members 366. The clutch mechanism 338 also includes a control part 368.

The toothed part 360 is disposed on the front sprocket 328. In particular, the toothed part 360 is disposed on an inner peripheral surface 385a of the front sprocket 328. The toothed part 360 has a plurality of engagement teeth 360a formed on the inner peripheral surface 385a of the front sprocket 328. The engagement teeth 360a selectively engage with the engagement pawls 364 for transmitting the rearward rotation of the crank axle 314 to the front sprocket 328.

The pawl support 362 is fixedly coupled to the crank axle 314. The pawl support 362 pivotally supports the engagement pawls 364 on an outer peripheral surface of the pawl support 362 in a conventional manner. In the illustrated embodiment, the toothed part 360 is disposed on the front sprocket 328, while the pawl support 362 is fixedly coupled to the crank axle 314. However, alternatively, the toothed part 360 can be disposed on the crank axle 314, while the pawl support 362 can be fixedly coupled to the front sprocket 328. In particular, the toothed part 360 can be disposed on an outer peripheral surface of the crank axle 314, while the pawl support 362 can be fixedly coupled to the inner peripheral surface 385a the front sprocket 328. Furthermore, the toothed part 360 can be disposed on one of the sprocket mounting portion 379 and the crank axle 314, while the pawl support 362 can be fixedly coupled to the other of the sprocket mounting portion 379 and the crank axle 314. In particular, the toothed part 360 can be disposed on one of the inner peripheral surface 385a of the sprocket mounting portion 379 and the outer peripheral surface of the crank axle 314, while the pawl support 362 can be fixedly coupled to the other of the inner peripheral surface 385a of the sprocket mounting portion 379 and the outer peripheral surface of the crank axle 314.

As shown in FIGS. 13A to 13M, the engagement pawls 364 are movably mounted to the pawl support 362 between a release position and an engagement position. Each of the engagement pawls 364 has an engagement end 364a and a pivot end 364b. The engagement ends 364a of the engagement pawls 364 are engaged with the engagement teeth 360a of the front sprocket 328 when the engagement pawls 364 are located at the engagement position, while the engagement ends 364a of the engagement pawls 364 are disengaged from the engagement teeth 360a of the front sprocket 328 when the engagement pawls 364 are moved towards the release position. The engagement pawls 364 are pivotally coupled to the pawl support 362 such that the engagement pawls 364 pivot about a pivot axis on the pivot end 364b in a conventional manner.

The biasing members 366 bias the engagement pawls 364 towards the engagement position, respectively. The biasing members 366 basically includes pawl springs operatively disposed between the engagement pawls 364 and the pawl support 362.

The control part 368 is disposed on an inner peripheral surface 379a of the sprocket mounting portion 379 (e.g., an output member) of the torque combining mechanism 336. The control part 368 selectively causes the engagement pawls 364 to engage with the toothed part 360 as the crank axle 314 rotates in the rearward rotational direction such that the clutch mechanism 338 transmits a rotation of the crank axle 314 to the front sprocket 328. On the other hand, the control part 368 is aligned with the toothed part 360 as the crank axle 314 rotates in the forward rotational direction such that the engagement pawls 364 slide over the control part 368 and the toothed part 360 as the crank axle 314 rotates in the forward rotational direction. More specifically, as shown in FIGS. 13A to 13M, the control part 368 has a plurality of bumps 391 circumferentially arranged on the inner peripheral surface 379a of the sprocket mounting portion 379. Each of the bumps 391 has a slope surface 391a. The slope surface 391a is flatter than an engagement surface 360b of each of the engagement teeth 360a that engages with the engagement pawls 364. Furthermore, the bumps 391 have a circumferential width in the circumferential direction that is larger than that of the engagement teeth 360a.

In the illustrated embodiment, the front sprocket 328 has an annular section 383 that has the sprocket teeth formed on the outer peripheral portion, and a cylindrical section 385 integrally formed on the inner peripheral portion of the annular section 383. The front sprocket 328 is movably attached to the inner peripheral surface 379a of the sprocket mounting portion 379. The front sprocket 328 rotates about the rotational axis X1 of the crank axle 314. Thus, the rotational axis of the crank axle 314 (e.g., a first rotational axis) and the rotational axis of the front sprocket 328 (e.g., a second rotational axis) are coincident with each other. However, of course, it will be apparent to those skilled in the art from this disclosure that front sprocket 328 and the crank axle 314 can be arranged with respect to each other such that the rotational axes of the front sprocket 328 and the crank axle 314 are offset with respect to each other. The front sprocket 328 has the engagement teeth 360a on the inner peripheral surface 385a of the cylindrical section 385.

Figure 13A:
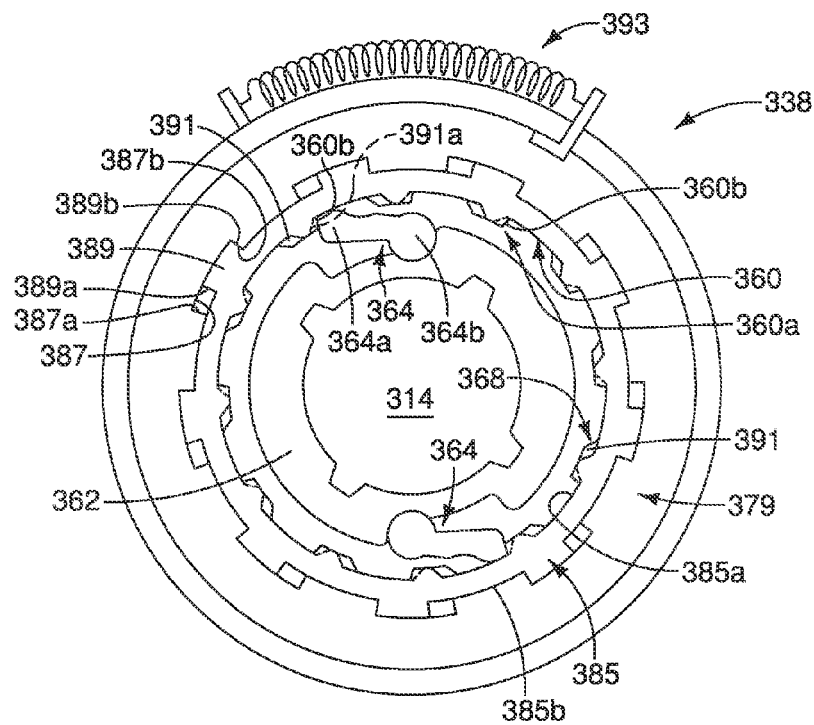
FIG. 13A is an elevational view of a clutch mechanism of the drive unit illustrated in FIG. 12, illustrating a state in which a crank axle is stationary.
Figure 13B:
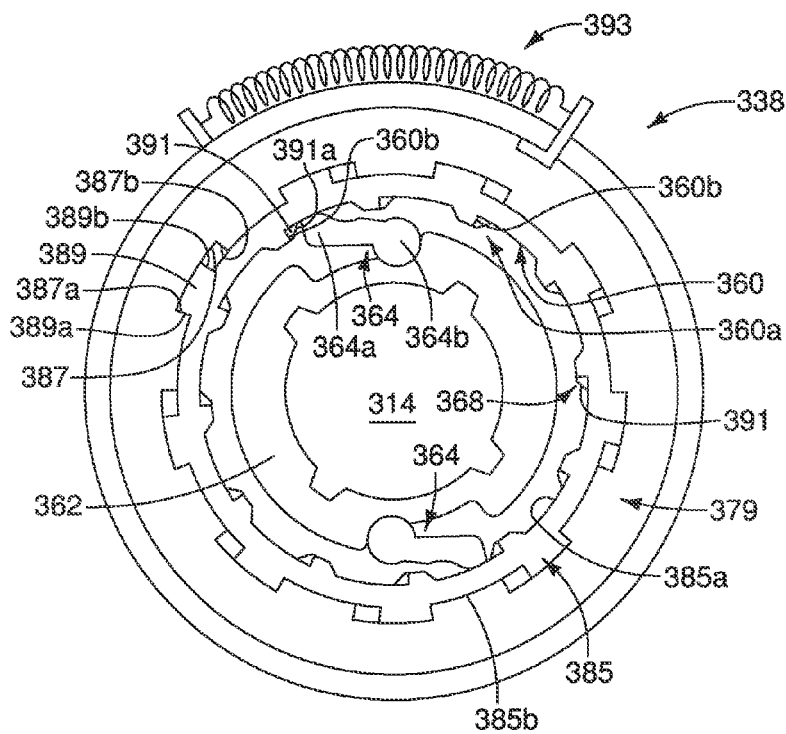
FIG. 13B is an elevational view of the clutch mechanism of the drive unit illustrated in FIG. 12, illustrating a state in which a sprocket mounting portion start to rotate from an initial position in a forward rotational direction while a crank axle rotates in the forward rotational direction.
Figure 13C:
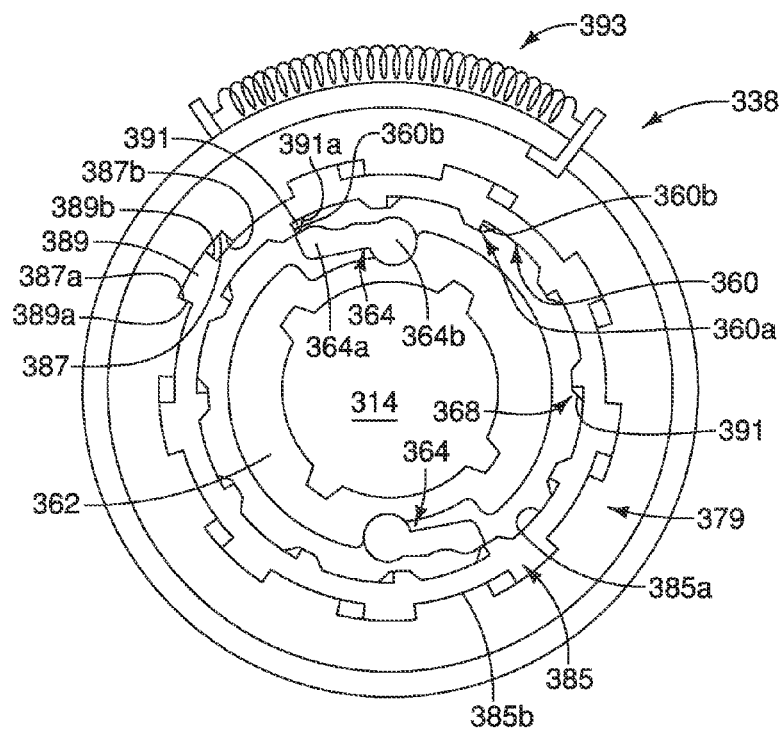
FIG. 13C is an elevational view of the clutch mechanism of the drive unit illustrated in FIG. 12, illustrating a state in which the sprocket mounting portion rotate from the initial position by five degrees in the forward rotational direction while the crank axle rotates in the forward rotational direction.
Figure 13D:
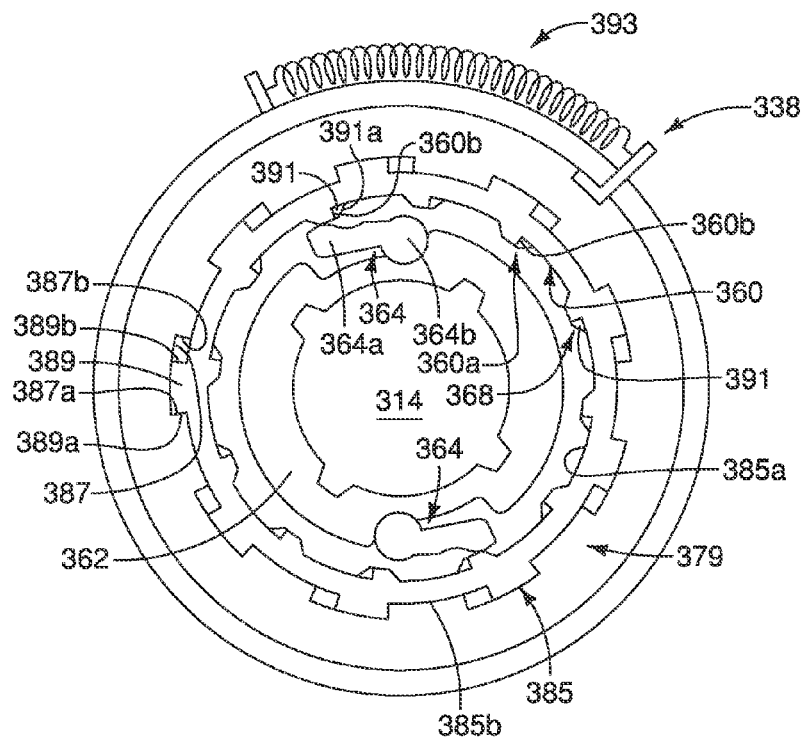
FIG. 13D is an elevational view of the clutch mechanism of the drive unit illustrated in FIG. 12, illustrating a state in which the sprocket mounting portion rotate from the initial position by twenty degrees in the forward rotational direction while the crank axle rotates in the forward rotational direction.
Figure 13E:
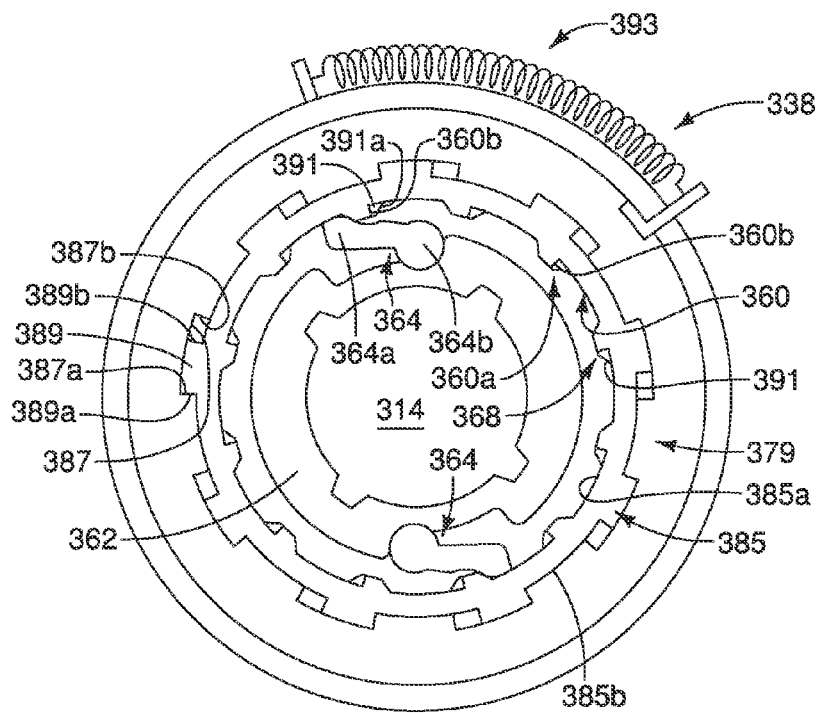
FIG. 13E is an elevational view of the clutch mechanism of the drive unit illustrated in FIG. 12, illustrating a state in which the sprocket mounting portion rotate from the initial position by twenty-five degrees in the forward rotational direction while the crank axle rotates in the forward rotational direction.

Furthermore, as shown in FIGS. 13A to 13M, the front sprocket 328 has a plurality of projections 389. In particular, the projections 389 are circumferentially arranged on an outer peripheral surface 385b of the cylindrical section 385. The sprocket mounting portion 379 of the torque combining mechanism 336 has a plurality of recesses 387. In particular, the recesses 387 are circumferentially arranged on the inner peripheral surface 379a of the sprocket mounting portion 379. The recesses 387 and the projections 389 are arranged relative to each other with circumferential spacings therebetween, respectively, to provide a limited range of relative rotation between the sprocket mounting portion 379 of the torque combining mechanism 336 and the front sprocket 328. In the illustrated embodiment, as shown in FIGS. 13B to 13E, and FIGS. 13H to 13K, the recesses 387 have first inside surfaces 387a, respectively, that circumferentially contact with first contact surfaces 389a of the projections 389, respectively, as the crank axle 314 rotates in the forward rotational direction such that a rotation of the crank axle 314 in the forward rotational direction is transmitted from the sprocket mounting portion 379 of the torque combining mechanism 336 to the front sprocket 328. Furthermore, as shown in FIGS. 13A and 13G, the recesses 387 have second inside surfaces 387b, respectively, that circumferentially contact with second contact surfaces 389b of the projections 389, respectively, while the crank axle 314 is stationary. In particular, as shown in FIGS. 13A and 13G, the front sprocket 328 is circumferentially biased in the clockwise direction with respect to the sprocket mounting portion 379 with a biasing or return spring 393. Furthermore, the front sprocket 328 is circumferentially biased with respect to the sprocket mounting portion 379 such that the engagement surface 360b of each of the engagement teeth 360a of the front sprocket 328 are disposed in the forward rotational direction of the crank axle 314 with respect to the slope surface 391a of corresponding one of the bumps 391 of the sprocket mounting portion 379 while the crank axle 314 is stationary.

In the illustrated embodiment, the sprocket mounting portion 379 of the torque combining mechanism 336 has the recesses 387, while the front sprocket 328 has the projections 389. However, alternatively, the sprocket mounting portion 379 of the torque combining mechanism 336 can have a plurality of projections, while the front sprocket 328 can have a plurality of recesses. In this case, the recesses and the projections are arranged relative to each other with circumferential spacings therebetween, respectively, to provide a limited range of relative rotation between the sprocket mounting portion 379 of the torque combining mechanism 336 and the front sprocket 328.

With this drive unit 310, as shown in FIG. 12, the torque generated by the pedaling force in the forward rotational direction is transmitted in the following transmission passage: the crank arms 101→the crank axle 314→the first rotation transmitting member 316→the second rotation transmitting member 320→the third rotation transmitting member 326→the gear shifting main body 332b→the first gear member 376→the second gear member 378. On the other hand, the output torque of the motor 330 is transmitted in the following path: the reduction gear unit 334→a torque transmitting member 370→the one-way clutch 380→the second gear member 378. The second gear member 378 combines these two torques to transmit them to the front sprocket 328.

Specifically, as shown in FIGS. 13A and 13G, while the crank axle 314 is stationary, the front sprocket 328 is circumferentially biased with respect to the sprocket mounting portion 379 such that the second inside surfaces 387b of the recesses 387 circumferentially contact with the second contact surfaces 389b of the projections 389, respectively. Furthermore, while the crank axle 314 is stationary, the engagement surface 360b of each of the engagement teeth 360a of the front sprocket 328 are disposed in the forward rotational direction of the crank axle 314 with respect to the slope surface 391a of corresponding one of the bumps 391 of the sprocket mounting portion 379.

As shown in FIG. 13B to 13E and 13H to 13K, when the crank axle 314 is rotated in the forward rotational direction, the second gear member 378 rotates in the clockwise direction with respect to the front sprocket 328 until the first inside surfaces 387a of the recesses 387 circumferentially contact with the first contact surfaces 389a of the projections 389, respectively. When the first inside surfaces 387a of the recesses 387 circumferentially contact with the first contact surfaces 389a of the projections 389, respectively, the rotation of the second gear member 378 is transmitted to the front sprocket 328, which rotate the second gear member 378 and the front sprocket 328 together in the forward rotational directions. The bumps 391 of the control part 368 and the engagement teeth 360a of the toothed part 360 are arranged with respect to each other such that the bumps 391 of the control part 368 are axially aligned with engagement teeth 360a of the toothed part 360 while the first inside surfaces 387a of the recesses 387 circumferentially contact with the first contact surfaces 389a of the projections 389, respectively. Thus, as shown in FIGS. 13H to 13K, the engagement pawls 364 slide over the bumps 391 of the control part 368 while pivoting between the engagement position and the release position as the crank axle 314 rotates in the forward rotational direction, which prevents the engagement pawls 364 from engaging with the engagement teeth 360a of the toothed part 360. Specifically, the forward rotational speed of the second gear member 378 is faster than the forward rotational speed of the crank axle 314 while the speed ratio of the second gear member 378 relative to the crank axle 314 is larger than one due to a selection of the gear ratios of the gear shifting mechanism 332. In this case, the engagement pawls 364 relatively slide over the bumps 391 of the control part 368 in the rearward rotational direction in order as illustrated in FIGS. 13H, 13I, 13J and 13K. On the other hand, the forward rotational speed of the second gear member 378 is slower than the rotational speed of the crank axle 314 while the speed ratio of the second gear member 378 relative to the crank axle 314 is smaller than one due to a selection of the gear ratios of the gear shifting mechanism 332. In this case, the engagement pawls 364 relatively slide over the bumps 391 of the control part 368 in the forward rotational direction in order as illustrated in FIGS. 13K, 13J, 13I and 13H. Therefore, the clutch mechanism 338 allows a relative rotation between the crank axle 314 and the front sprocket 328 in the forward rotational direction.

On the other hand, with this drive unit 10, the rearward rotation of the crank arms 101 is also transmitted to the front sprocket 328 to rotate the front sprocket 328 in the rearward rotational direction. Specifically, the torque generated by the pedaling force in the rearward rotational direction is transmitted in the following transmission passage: the crank arms 101→the crank axle 314→the clutch mechanism 338→the front sprocket 328. The rearward rotation of the crank arms 101 is not transmitted to the second gear member 378 via the gear shifting mechanism 332 by the operation of a one-way clutch disposed in the gear shifting mechanism 332.

Figure 13F:
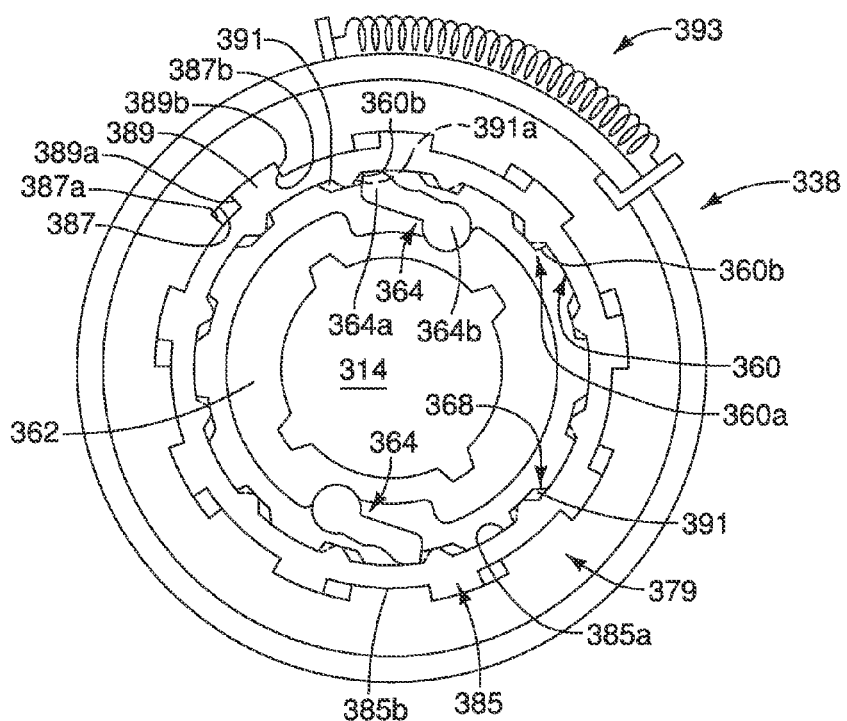
FIG. 13F is an elevational view of the clutch mechanism of the drive unit illustrated in FIG. 12, illustrating a state in which the crank axle is stopped and the crank axle is rotated in a rearward direction.
Figure 13G:
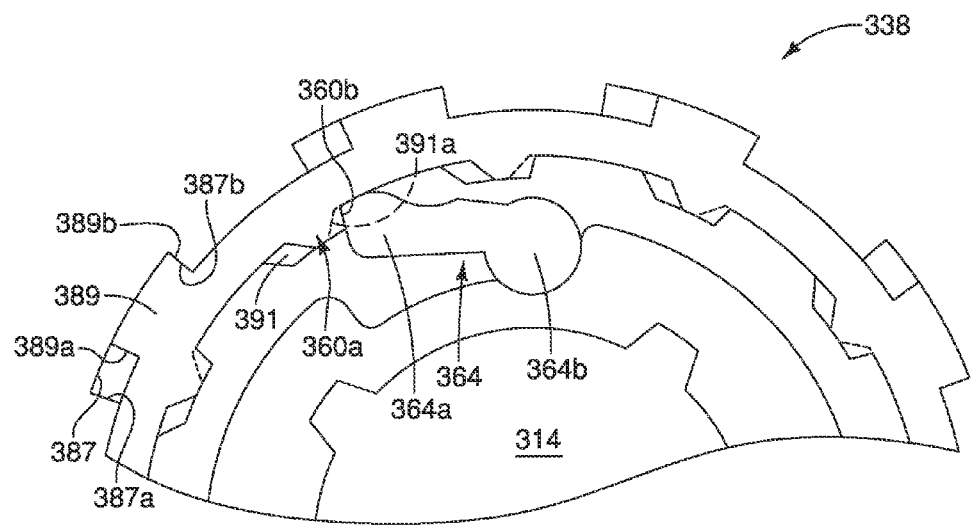
FIG. 13G is a partial elevational view of a clutch mechanism of the drive unit illustrated in FIG. 12, illustrating a state in which the crank axle is stationary.
Figure 13H:
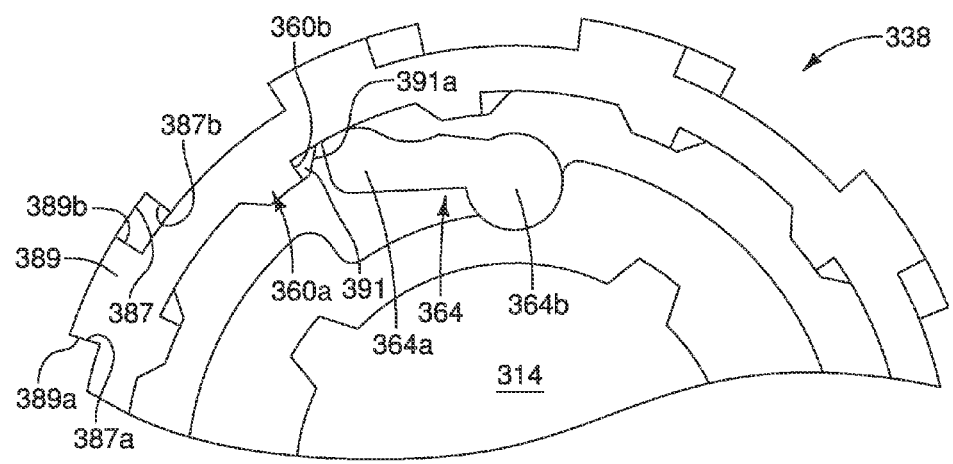
FIG. 13H is a partial elevational view of the clutch mechanism of the drive unit illustrated in FIG. 12, illustrating a state in which the sprocket mounting portion start to rotate from the initial position in the forward rotational direction while the crank axle rotates in the forward rotational direction.
Figure 13I:
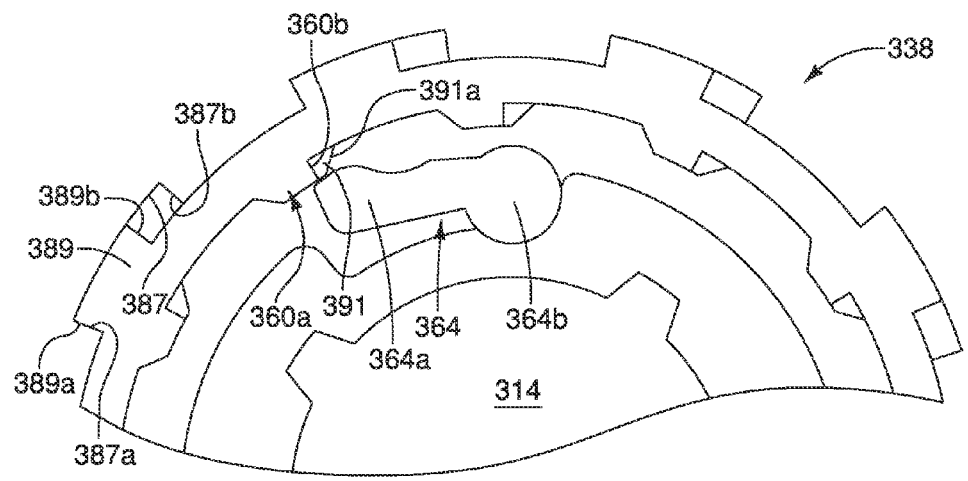
FIG. 13I is a partial elevational view of the clutch mechanism of the drive unit illustrated in FIG. 12, illustrating a state in which the sprocket mounting portion rotate from the initial position by five degrees in the forward rotational direction while the crank axle rotates in the forward rotational direction.
Figure 13J:
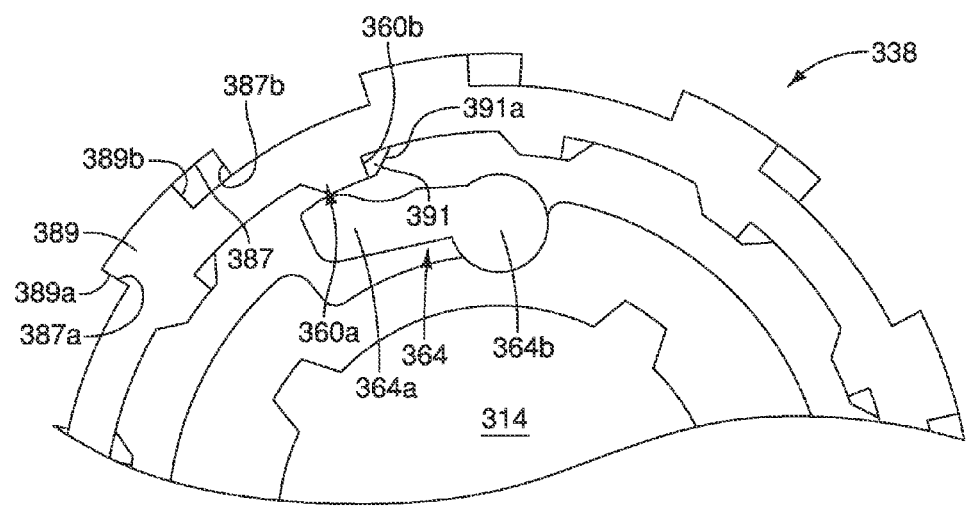
FIG. 13J is a partial elevational view of the clutch mechanism of the drive unit illustrated in FIG. 12, illustrating a state in which the sprocket mounting portion rotate from the initial position by twenty degrees in the forward rotational direction while the crank axle rotates in the forward rotational direction.
Figure 13K:
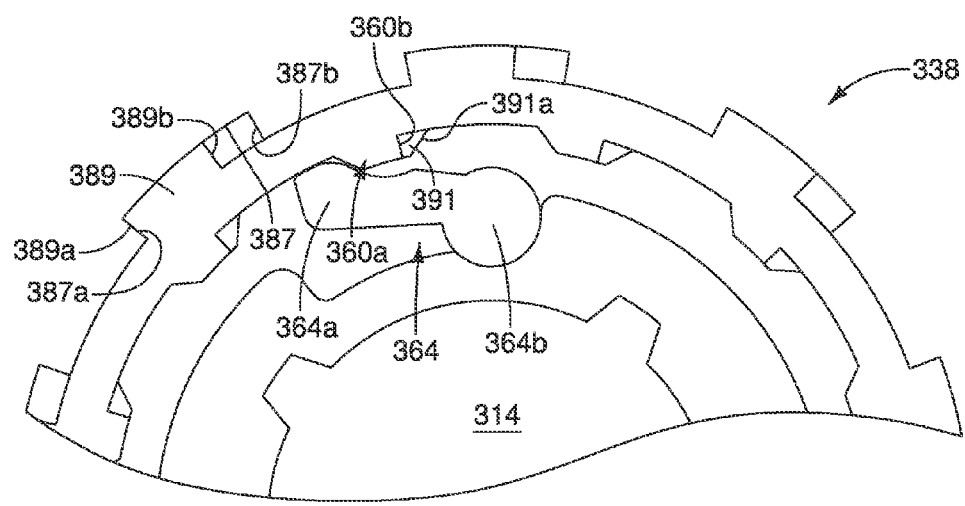
FIG. 13K is a partial elevational view of the clutch mechanism of the drive unit illustrated in FIG. 12, illustrating a state in which the sprocket mounting portion rotate from the initial position by twenty-five degrees in the forward rotational direction while the crank axle rotates in the forward rotational direction.
Figure 13L:
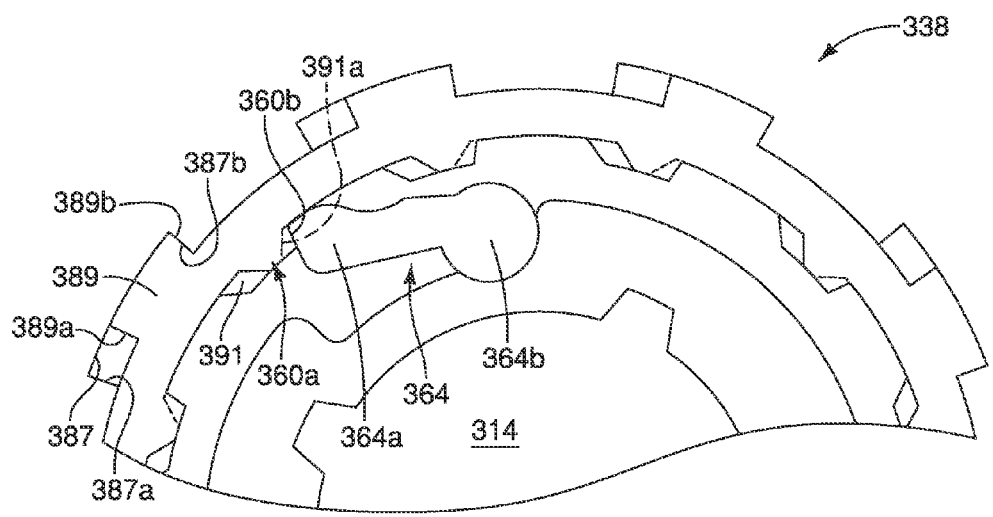
FIG. 13L is a partial elevational view of the clutch mechanism of the drive unit illustrated in FIG. 12, illustrating a state in which the crank axle is stopped and the crank axle is rotated in a rearward direction.
Figure 13M:
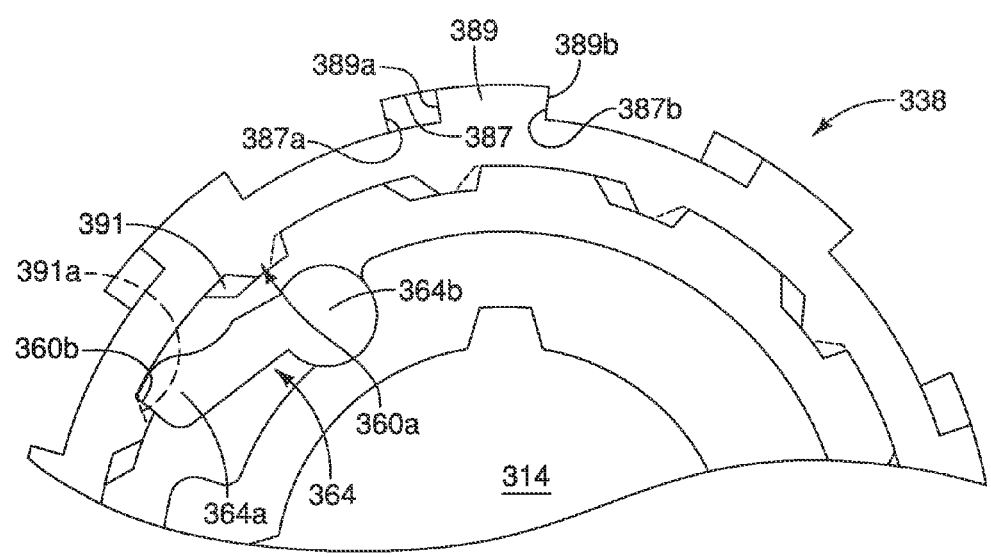
FIG. 13M is a partial elevational view of the clutch mechanism of the drive unit illustrated in FIG. 12, illustrating a state in which the crank axle is further rotated in the rearward direction.

As shown in FIGS. 13F, 13L and 13M, when the crank axle 314 is stopped, the front sprocket 328 is rotated with respect to the sprocket mounting portion 379 in the clockwise direction with the biasing force of the return spring 393. With this biasing force, the front sprocket 328 is rotated with respect to the sprocket mounting portion 379 such that the second inside surfaces 387b of the recesses 387 circumferentially contact with the second contact surfaces 389b of the projections 389, respectively. When the second inside surfaces 387b of the recesses 387 circumferentially contact with the second contact surfaces 389b of the projections 389, respectively, the engagement surface 360b of each of the engagement teeth 360a of the front sprocket 328 are disposed in the forward rotational direction of the crank axle 314 with respect to the slope surface 391a of corresponding one of the bumps 391 of the sprocket mounting portion 379. Thus, when crank axle 314 is rotated in the rearward rotational direction, the engagement ends 364a of the engagement pawls 364 engage with the engagement surfaces 360b of the engagement teeth 360a of the front sprocket 328, which rotates the front sprocket 328 in the rearward rotational direction together with the sprocket mounting portion 379. Accordingly, the rearward rotation of the crank arms 101 is transmitted to the front sprocket 328 to rotate the front sprocket 328 in the rearward rotational direction, thereby operating the coaster brake 104a of the rear hub 104.

Third Embodiment

Figure 14:
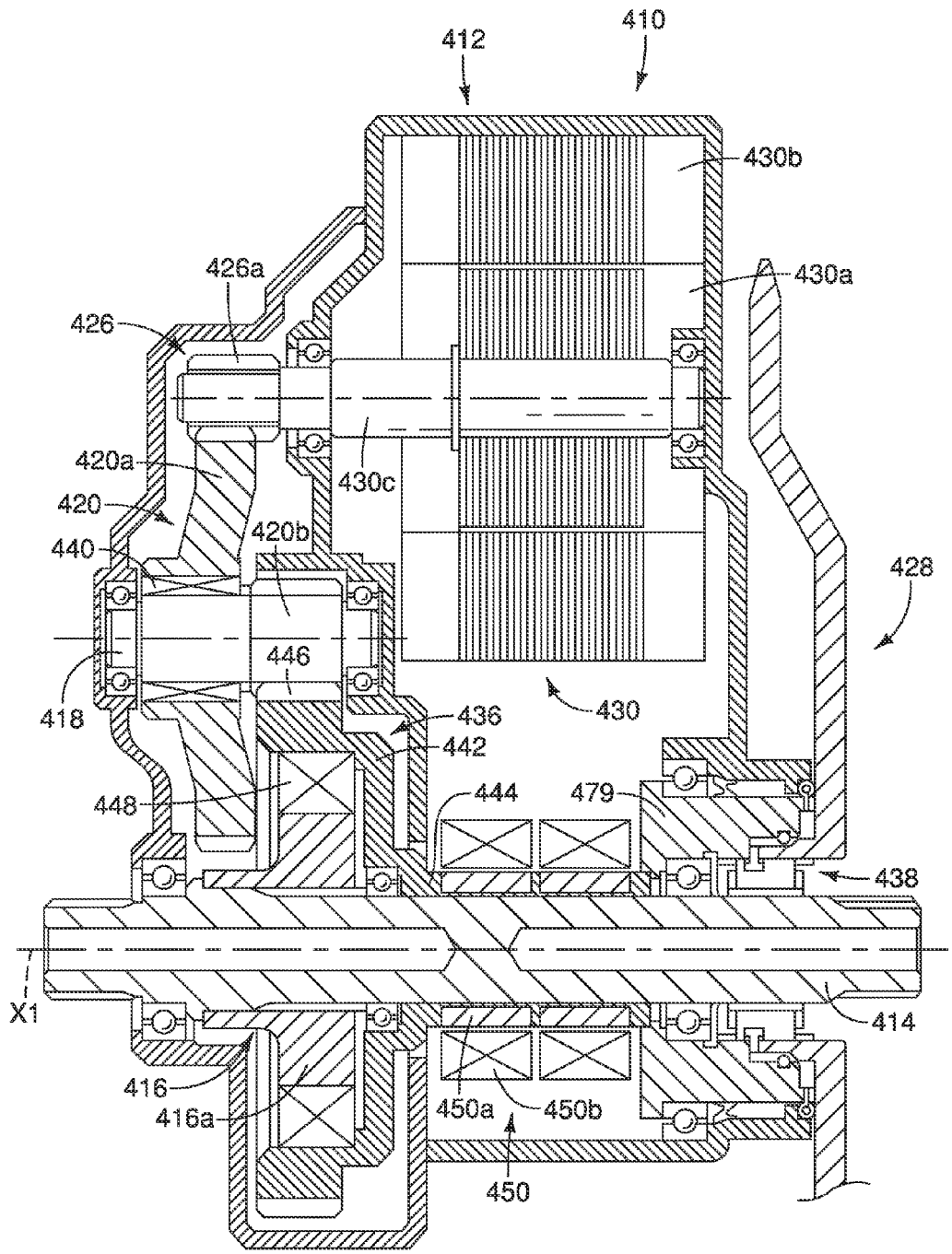
FIG. 14 is a cross-sectional view illustrating a drive unit in accordance with a third embodiment.

Referring now to FIG. 14, a drive unit 410 in accordance with a third embodiment will now be explained.

In view of the similarity between the first and third embodiments, the parts of the third embodiment that are identical to the parts of the first embodiment will be given the same reference numerals as the parts of the first embodiment. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

Basically, the drive unit 410 is arranged in a vicinity of the crank arms 101 (see FIG. 1). In the illustrated embodiment, as shown in FIG. 14, the drive unit 410 has a housing 412, a crank axle 414, a first rotation transmitting member 416, an intermediate axle 418, a second rotation transmitting member 420, a third rotation transmitting member 426 and a front sprocket 428 (e.g., a sprocket). As shown in FIG. 14, the drive unit 410 has a motor 430, a torque combining mechanism 436, and a clutch mechanism 438. Thus, the bicycle drive unit 410 includes the motor 430, the crank axle 414, the torque combining mechanism 436, and the clutch mechanism 438.

In the illustrated embodiment, the crank axle 414 and the front sprocket 428 are identical to the crank axle 314 and the front sprocket 328 in accordance with the second embodiment. Thus, the detailed configurations will be omitted for the sake of brevity. Furthermore, the clutch mechanism 438 is identical to the clutch mechanism 338 in accordance with the second embodiment, except that parts of the clutch mechanism 438 corresponding to parts of the clutch mechanism 338 that are disposed on the sprocket mounting portion 379 are disposed on a sprocket mounting portion 479 that is fixedly coupled to an axially extending sleeve 444 of the torque combining mechanism 436. However, it will be apparent to those skilled in the art from this disclosure how the clutch mechanism 338 in accordance with the second embodiment can be applied to in the drive unit 410 in accordance with the third embodiment. Thus, the detailed configurations will be omitted for the sake of brevity.

The housing 412 mainly accommodates the first rotation transmitting member 416, the intermediate axle 418, the second rotation transmitting member 420, the third rotation transmitting member 426, the motor 430, and the torque combining mechanism 436. The housing 412 also rotatably supports the crank axle 414 by a pair of bearings in a conventional manner. The crank axle 414 extends through the housing 412.

The crank axle 414 is rotatable about a rotational axis X1 (e.g., a first rotational axis). The first rotation transmitting member 416 has a first gear 416*a* that is fixedly coupled to the crank axle 414. The intermediate axle 418 is rotatably supported inside the housing 412 by a pair of bearings. The second rotation transmitting member 420 has a large gear 420*a* and a small gear 420*b*. The third rotation transmitting member 426 has a third gear 426*a*. The front sprocket 428 (e.g., a sprocket) is identical to the front sprocket 328 in accordance with the second embodiment. The front sprocket 428 rotates about the rotational axis X1 of the crank axle 414. Thus, the rotational axis of the crank axle 414 (e.g., a first rotational axis) and the rotational axis of the front sprocket 428 (e.g., a second rotational axis) are coincident with each other.

In the illustrated embodiment, the motor 430 is an inner rotor-type motor. The motor 430 has a rotor 430*a* and a stator 430*b*. Since the motor 430 has a conventional configuration, the detailed description will be omitted for the sake of brevity. The stator 430*b* is fixedly coupled to an inner side surface of the housing 412. The rotor 430*a* is fixedly coupled to a drive shaft 430*c* of the motor 430. The drive shaft 430*c* is rotatably supported relative to the housing by a pair of bearings.

The third gear 426*a* of the third rotation transmitting member 426 is fixedly coupled to a distal end of the drive shaft 430*c* of the motor 430. The third gear 426*a* also meshes with the large gear 420*a* of the second rotation transmitting member 420. The large gear 420*a* is rotatably coupled to the intermediate axle 418 via a one-way clutch 440. The one-way clutch 440 only transmits rotational output of the motor 430 for the forward rotation of the front sprocket 428 to the intermediate axle 418. The small gear 420*b* is fixedly coupled to the intermediate axle 418.

The torque combining mechanism 436 is operatively coupled to the motor 430 and the crank axle 414 to combine rotational outputs of the motor 430 and the crank axle 414. The torque combining mechanism 436 has a casing portion 442 and an axially extending sleeve 444. The torque combining mechanism 436 is rotatably supported on the crank axle 414 by a bearing. The casing portion 442 has an outer gear 446 on an outer peripheral surface of the casing portion 442. The outer gear 446 meshes with the small gear 420*b* of the second rotation transmitting member 420. The casing portion 442 is rotatably coupled to the first rotation transmitting member 416 via a one-way clutch 448. In particular, the one-way clutch 448 is disposed between to an inner peripheral surface of the casing portion 442 and the first gear 416*a* of the first rotation transmitting member 416. The one-way clutch 448 only transmits the forward rotation of the crank axle 414 to the casing portion 442 of the torque combining mechanism 436. Thus, the torque combining mechanism 436 combines the rotational output of the motor 430 transmitted to the outer gear 446 of the casing portion 442 and the rotational output of the crank axle 414 transmitted from the first gear 416*a* via the one-way clutch 448. The axially extending sleeve 444 has a torque sensor 450 with a pair of magnetic deflection elements 450*a* and a pair of coils 450*b* that radially face with each other, respectively. The torque detected by the torque sensor 450 is used to control the rotational output of the motor 430. Of course, it will be apparent to those skilled in the art from this disclosure that the torque sensor 450 can be other type of torque sensors.

The sprocket mounting portion 479 is configured to be operatively attached to the front sprocket 428 (e.g., a sprocket) such that the front sprocket 428 rotates about the rotational axis X1 (e.g., a second rotational axis of a sprocket) in the forward rotational direction (e.g., a first direction) as the crank axle 414 rotates about the rotational axis X1 in the forward rotational direction. The sprocket mounting portion 479 is fixedly coupled to a distal end of the axially extending sleeve 444 such that sprocket mounting portion 479 rotates together with the torque combining mechanism 436. The sprocket mounting portion 479 is identical to the sprocket mounting portion 379 in accordance with the second embodiment. Thus, the detailed configuration will be omitted for the sake of brevity.

The clutch mechanism 438 is operatively disposed between the crank axle 414 and the front sprocket 428. The clutch mechanism 438 is configured to rotate the front sprocket 428 about the rotational axis X1 (e.g., a second rotational axis) in the rearward rotational direction (e.g., a second direction) as the crank axle 414 rotates about the rotational axis X1 in the rearward rotational direction. The rearward rotational direction is opposite the forward rotational direction.

With this drive unit 410, the torque generated by the pedaling force in the forward rotational direction is transmitted in the following transmission passage: the crank arms 101→the crank axle 414→the first rotation transmitting member 416→the one-way clutch 448→the torque combining mechanism 436. On the other hand, the output torque of the motor 430 is transmitted in the following path: the third rotation transmitting member 426→the second rotation transmitting member 420→the torque combining mechanism 436. The torque combining mechanism 436 combines these two torques to transmit them to the front sprocket 428 via the sprocket mounting portion 479. Thus, the forward rotation of the crank arms 101 is transmitted to the front sprocket 428 after being assisted by the motor 430. The torque transmission from the sprocket mounting portion 479 to the front sprocket 428 is identical to the torque transmission from the sprocket mounting portion 379 to the front sprocket 328 in accordance with the second embodiment. Thus, the detailed description will be omitted for the sake of brevity.

On the other hand, with this drive unit 410, the rearward rotation of the crank arms 101 is also transmitted to the front sprocket 428 to rotate the front sprocket 428 in the rearward rotational direction. Specifically, the torque generated by the pedaling force in the rearward rotational direction is transmitted in the following transmission passage: the crank arms 101→the crank axle 414→the clutch mechanism 438→the front sprocket 428. The rearward rotation of the crank arms 101 is not transmitted to the casing portion 442 of the torque combining mechanism 436 via the first rotation transmitting member 416 by the operation of the one-way clutch 448. The torque transmission from the clutch mechanism 438 to the front sprocket 428 is identical to the torque transmission from the clutch mechanism 338 to the front sprocket 328 in accor-

Fourth Embodiment

Figure 15:
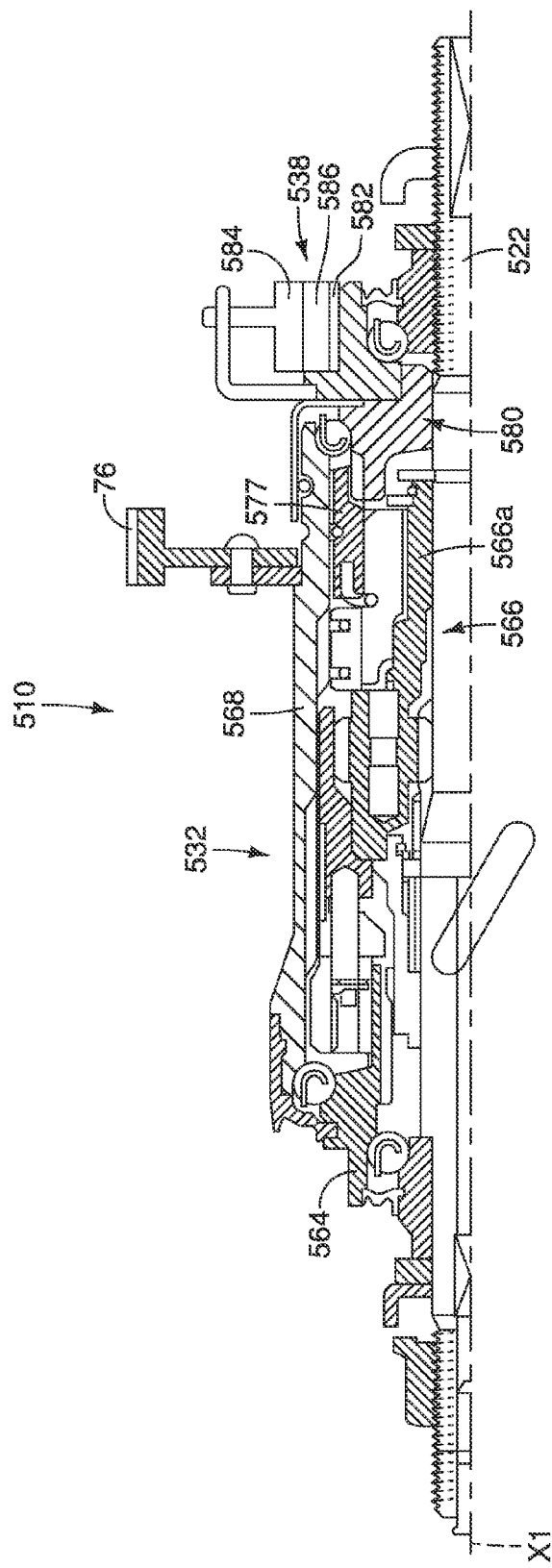
FIG. 15 is a cross-sectional view illustrating a drive unit in accordance with a fourth embodiment.

Referring now to FIG. 15, a drive unit 510 in accordance with a fourth embodiment will now be explained.

In view of the similarity between the first and fourth embodiments, the parts of the fourth embodiment that are identical to the parts of the first embodiment will be given the same reference numerals as the parts of the first embodiment. In any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

As shown in FIG. 2, the drive unit 10 in accordance with the first embodiment includes the gear shifting mechanism 32 and the clutch mechanism 38 that transmit the rotation of the input part 64 caused by the forward rotation of the crank axle 14 to the output part 68 such that the front sprocket 28 rotates in the forward rotational direction. The gear shifting mechanism 32 and the clutch mechanism 38 also transmit the rotation of the input part 64 caused by the rearward rotation of the crank axle 14 to the output part 68 such that the front sprocket rotates in the rearward rotational direction. The drive unit in accordance with the present application can include any types of gear shifting mechanisms and the clutch mechanism having the above-mentioned feature. For example, as shown in FIG. 15, the drive unit 510 in accordance with the fourth embodiment has a gear shifting mechanism 532 and the clutch mechanism 538. This gear shifting mechanism 532 and the clutch mechanism 538 is basically identical to the internally mounted hub transmission disclosed in European Patent No. EP 1 700 780 B1, except that the gear shifting mechanism 532 and the clutch mechanism 538 are installed in the drive unit 510. The drive unit 510 is also identical to the drive unit 10 shown in FIG. 2, except that the drive unit 510 has the gear shifting mechanism 532 and the clutch mechanism 538 instead of the gear shifting mechanism 32 and the clutch mechanism 38. Thus, detailed description of the gear shifting mechanism 532, the clutch mechanism 538 and the drive unit 510 will be omitted for the sake of brevity. This gear shifting mechanism 532 and the clutch mechanism 538 selectively establishes three gear ratios for the forward rotation of the front sprocket 28 and one gear ratio of the rearward rotation of the front sprocket 28.

The gear shifting mechanism 532 mainly includes a support axle 522, an input part 564, a planetary gear unit 566, and an output part 568. The rotation of the third rotation transmitting member 26 (see FIG. 2) is transmitted to the input part 564, the planetary gear unit 566 and the output part 568. The input part 564, the planetary gear unit 566 and the output part 568 are rotatably supported on the support axle 522, respectively.

Specifically, the input part 564 is rotatably supported on the support axle 522 and operatively coupled to the crank axle 14 (see FIG. 2). The second sprocket 26a of the third rotation transmitting member 26 (see FIG. 2) is fixedly coupled to the input part 564 such that they can rotate together. The planetary gear unit 566 is disposed between the input part 564 and the output part 568. The planetary gear unit 566 selectively establishes a plurality of (e.g., three) gear ratios. The planetary gear unit 566 transmits power between the input part 564 and the output part 568. The output part 568 is rotatably supported on the support axle 522 and operatively coupled to the torque combining mechanism 36 (see FIG. 2). The output part 568 outputs the rotation after changing the rotational speed by the planetary gear unit 566 to the torque combining mechanism 36 (see FIG. 2). The first gear member 76 of the torque combining mechanism 36 (see FIG. 2) is coupled to the output part 568.

The gear shifting mechanism 532 further has a roller brake 577, which itself is known as a coaster brake unit. When the clank axle 14 is rotated in the rearward rotational direction, the rearward rotational power is transmitted to the planetary gear unit 566 and causes the roller brake 577 to rotate rearward.

The drive unit 510 further has a clutch mechanism 538 that is operatively disposed between the crank axle 14 and the front sprocket 28 (see FIG. 2). The clutch mechanism 538 is configured to rotate the front sprocket 28 in the rearward rotational direction as the crank axle 14 rotates in the rearward rotational direction. The clutch mechanism 538 is supported to the support axle 522 of the gear shifting mechanism 532 such that the clutch mechanism 538 is operatively disposed between a planetary gear carrier 566a of the planetary gear unit 566 and the output part 568 of the gear shifting mechanism 532. Specifically, as shown in FIG. 15, a brake cup 580 carries the roller brake 577, an inner free gear 582, an outer free gear 584, and a one-way clutch 586 between the inner and outer free gears 582 and 584, which form the clutch mechanism 538. The outer free gear 584 is fixedly coupled to the housing 12 (see FIG. 2). The one-way clutch 586 is configured to transmit a rearward rotational force from the brake cup 580 to the outer free gear 584. As a result, the roller brake 577 transmits the rearward rotational power to the output part 568 such that the front sprocket 28 rotates in the rearward rotational direction.

In the illustrated embodiment, the gear shifting mechanism 32 and 532 have eight and three speed transmission units, respectively. However, they can be replaced by a two, five, seven, nine or eleven speed transmission unit.

In understanding the scope of the present invention, the term "coupled" or "coupling", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "attached", "mounted", "bonded", "fixed" and their derivatives.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   a motor;
   a crank axle rotatable about a first rotational axis;
   a torque combining mechanism operatively coupled to the motor and the crank axle to combine rotational outputs of the motor and the crank axle, the torque combining mechanism having a sprocket mounting portion that is configured to be operatively attached to a sprocket such that the sprocket rotates about a second rotational axis of the sprocket in a first direction as the crank axle rotates about the first rotational axis in the first direction; and
   a clutch mechanism operatively disposed between the crank axle and the sprocket, the clutch mechanism being configured to rotate the sprocket about the second rotational axis in a second direction as the crank axle rotates about the first rotational axis in the second direction, the second direction being opposite the first direction.

2. The bicycle drive unit according to claim 1, wherein the first and second rotational axes are coincident with each other.

3. The bicycle drive unit according to claim 1, wherein the clutch mechanism permits a relative rotation between the crank axle and the sprocket in the first direction.

4. The bicycle drive unit according to claim 1, further comprising
   a gear shifting mechanism including
      a support axle,
      an input part rotatably supported on the support axle and operatively coupled to the crank axle,
      an output part rotatably supported on the support axle and operatively coupled to the torque combining mechanism, and
      a planetary gear unit disposed between the input part and the output part.

5. The bicycle drive unit according to claim 4, wherein the clutch mechanism is supported to the support axle of the gear shifting mechanism such that the clutch mechanism is operatively disposed between a planetary gear carrier of the planetary gear unit and the output part of the gear shifting mechanism.

6. The bicycle drive unit according to claim 5, wherein the clutch mechanism includes
   a toothed part disposed on one of the output part of the gear shifting mechanism and the planetary gear carrier of the planetary gear unit,
   a pawl support movably attached to the other of the output part of the gear shifting mechanism and the planetary gear carrier of the planetary gear unit,
   an engagement pawl movably mounted to the pawl support between a release position and an engagement position, and
   a biasing member biasing the engagement pawl towards the engagement position.

7. The bicycle drive unit according to claim 5, wherein the clutch mechanism includes
   an internally toothed part disposed on an inner peripheral surface of the output part of the gear shifting mechanism,
   a pawl support movably attached to the planetary gear carrier of the planetary gear unit,
   an engagement pawl movably mounted to the pawl support between a release position and an engagement position,
   a biasing member biasing the engagement pawl towards the engagement position, and
   a control part disposed on an outer peripheral surface of the planetary gear carrier of the planetary gear unit, the control part selectively causing the engagement pawl to engage with the toothed part as the crank axle rotates in the second direction such that the clutch mechanism transmits a rotation of the crank axle to the output part of the gear shifting mechanism.

8. The bicycle drive unit according to claim 6, wherein the pawl support has one of a recess and a projection disposed in a circumferential direction of the pawl support, and
the planetary gear carrier of the planetary gear unit has the other of the recess and the projection located in the recess,
the recess and the projection being arranged relative to each other with circumferential spacing therebetween to provide a limited range of relative rotation between the pawl support and the planetary gear carrier.

9. The bicycle drive unit according to claim 8, wherein the projection has a contact surface that circumferentially contacts with an inside surface of the recess as the crank axle rotates in the first direction such that the rotation of the crank axle in the first direction is transmitted from the planetary gear carrier of the planetary gear unit to the output part of the gear shifting mechanism.

10. The bicycle drive unit according to claim 6, wherein the clutch mechanism further includes a retaining member operatively disposed between the support axle and the pawl support, the retaining member maintaining relative angular position between the pawl support and the support axle before the engagement pawl engages with the output part.

11. The bicycle drive unit according to claim 10, wherein the retaining member of the clutch mechanism further includes a slide spring having a leg portion and a ring portion, the leg portion being non-rotatably coupled to the support axle of the gear shifting mechanism, the ring portion extending from the leg portion and being disposed in an outer circumferential groove of the pawl support of the clutch mechanism.

12. The bicycle drive unit according to claim 4, wherein the planetary gear unit includes first and second sun gears that are operatively connected by a slide spring.

13. The bicycle drive unit according to claim 12, wherein the slide spring has a leg portion and a ring portion, the leg portion being disposed in a receiving hole of the first sun gear, the ring portion extending from the leg portion and being disposed in an inner circumferential groove of the second sun gear.

14. The bicycle drive unit according to claim 1, wherein the clutch mechanism is supported on one of the crank axle, the sprocket and the torque combining mechanism between the crank axle and the sprocket.

15. The bicycle drive unit according to claim 14, further comprising
a gear shifting mechanism including
a support axle,
an input part rotatably supported on the support axle and operatively coupled to the crank axle,
an output part rotatably supported on the support axle and operatively coupled to the torque combining mechanism, and
a planetary gear unit disposed between the input part and the output part.

16. The bicycle drive unit according to claim 14, wherein the clutch mechanism includes
a toothed part disposed on one of the sprocket mounting portion and the crank axle,
a pawl support fixedly coupled to the other of the sprocket mounting portion and the crank axle,
an engagement pawl movably mounted to the pawl support between a release position and an engagement position, and
a biasing member biasing the engagement pawl towards the engagement position.

17. The bicycle drive unit according to claim 14, wherein the clutch mechanism includes
a toothed part disposed on one of the sprocket and the crank axle,
a pawl support fixedly coupled to the other of the sprocket and the crank axle,
an engagement pawl movably mounted to the pawl support between a release position and an engagement position, and
a biasing member biasing the engagement pawl towards the engagement position.

18. The bicycle drive unit according to claim 14, wherein the clutch mechanism includes
an internally toothed part disposed on an inner peripheral surface of the sprocket,
a pawl support fixedly coupled to the crank axle,
an engagement pawl movably mounted to the pawl support between a release position and an engagement position,
a biasing member biasing the engagement pawl towards the engagement position, and
a control part disposed on an inner peripheral surface of an output member of the torque combining mechanism, the control part selectively causing the engagement pawl to engage with the toothed part as the crank axle rotates in the second direction such that the clutch mechanism transmits a rotation of the crank axle to the sprocket.

19. The bicycle drive unit according to claim 18, wherein the control part is aligned with the toothed part as the crank axle rotates in the first direction such that the engagement pawl slides over the control part and the toothed part as the crank axle rotates in the first direction.

20. The bicycle drive unit according to claim 14, wherein the sprocket mounting portion of the torque combining mechanism has one of a recess and a projection, and
the sprocket has the other of the recess and the projection, the recess and the projection being arranged relative to each other with circumferential spacing therebetween to provide a limited range of relative rotation between the sprocket mounting portion of the torque combining mechanism and the sprocket.

21. The bicycle drive unit according to claim 20, wherein the recess has an inside surface that circumferentially contacts with a contact surface of the projection as the crank axle rotates in the first direction such that a rotation of the crank axle in the first direction is transmitted from the sprocket mounting portion of the torque combining mechanism to the sprocket.

22. The bicycle drive unit according to claim 1, wherein the motor includes a crank axle receiving hole, and
the crank axle is rotatably disposed in the crank axle receiving hole of the motor.

23. The bicycle drive unit according to claim 1, wherein the torque combining mechanism is operatively connected to a rotational output portion of the motor through a one-way clutch to receive the rotational output of the motor.

* * * * *